US010951606B1

United States Patent
Shahidzadeh et al.

(10) Patent No.: US 10,951,606 B1
(45) Date of Patent: Mar. 16, 2021

(54) CONTINUOUS AUTHENTICATION THROUGH ORCHESTRATION AND RISK CALCULATION POST-AUTHORIZATION SYSTEM AND METHOD

(71) Applicant: Acceptto Corporation, Portland, OR (US)

(72) Inventors: Shahrokh Shahidzadeh, Portland, OR (US); Nahal Shahidzadeh, Portland, OR (US); Christopher Clifford, Portland, OR (US); Haitham Akkary, Portland, OR (US); Seyedamir Karimikho, Surrey (CA)

(73) Assignee: Acceptto Corporation, Portland, OR (US)

( * ) Notice: Subject to any disclaimer, the term of this patent is extended or adjusted under 35 U.S.C. 154(b) by 0 days.

(21) Appl. No.: 17/112,913

(22) Filed: Dec. 4, 2020

Related U.S. Application Data

(60) Provisional application No. 62/943,767, filed on Dec. 4, 2019.

(51) Int. Cl.
| | | |
|---|---|---|
| *H04L 29/06* | (2006.01) | |
| *G06F 21/62* | (2013.01) | |
| *G06F 9/44* | (2018.01) | |
| *H04W 4/14* | (2009.01) | |
| *H04W 4/029* | (2018.01) | |

(52) U.S. Cl.
CPC ...... *H04L 63/0815* (2013.01); *H04L 63/0807* (2013.01); *H04W 4/029* (2018.02); *H04W 4/14* (2013.01)

(58) Field of Classification Search
CPC ........... H04L 63/0815; H04L 63/0807; H04W 4/029; H04W 4/14

USPC .......................................................... 726/8
See application file for complete search history.

(56) References Cited

U.S. PATENT DOCUMENTS

| | | | |
|---|---|---|---|
| 5,903,882 A | 5/1999 | Asay | |
| 6,636,721 B2 | 10/2003 | Threadgill | |
| 6,850,497 B1 | 2/2005 | Sigler | |
| 7,243,369 B2 | 7/2007 | Bhat | |
| 7,260,734 B2 | 8/2007 | Dickinson | |
| 7,395,435 B2 | 7/2008 | Benhammou | |
| 7,584,152 B2 | 9/2009 | Gupta | |
| 7,698,398 B1 * | 4/2010 | Lai | G06Q 10/10 709/223 |
| 7,721,322 B2 | 5/2010 | Sastry | |

(Continued)

OTHER PUBLICATIONS

Khanna, Tarun, "Contextual Intelligence", Harvard Business Review, Sep. 2014.

*Primary Examiner* — Haresh N Patel
(74) *Attorney, Agent, or Firm* — Roark IP

(57) ABSTRACT

A system and method for secure authentication of user entity and user entity device identity. The system and method described herein allows an identity to be continuously proven because of user entity's behavior and their biometrics. With all the fraud and risk that exists today, if someone has a user entity's driver's license they can do a lot of harm. A primary identity provider receives user contextual and behavioral information from third party secondary identity providers to allow risk based continuous authentication and step up post-authorization authentication or termination of session as required upon detection of an anomaly by third party identity provider.

8 Claims, 7 Drawing Sheets

(56) References Cited

U.S. PATENT DOCUMENTS

| | | |
|---|---|---|
| 7,962,419 B2 | 6/2011 | Gupta |
| 7,971,062 B1 | 6/2011 | Hughes et al. |
| 8,127,142 B2 | 2/2012 | Cuppett |
| 8,127,982 B1 | 3/2012 | Casey |
| 8,205,249 B2 | 6/2012 | Meister et al. |
| 8,261,089 B2 | 9/2012 | Cobos et al. |
| 8,346,924 B1 | 1/2013 | Bucher et al. |
| 8,423,476 B2 | 4/2013 | Bishop |
| 8,457,781 B2 | 6/2013 | Bailey |
| 8,510,797 B2 | 8/2013 | Kasturi |
| 8,510,811 B2 | 8/2013 | Kuang et al. |
| 8,516,542 B2 | 8/2013 | Lerner |
| 8,572,714 B2 | 10/2013 | Radhakrishnan |
| 8,612,357 B2 | 12/2013 | Phillips |
| 8,615,562 B1 | 12/2013 | Huang |
| 8,756,661 B2 | 6/2014 | Levenberg |
| 8,776,204 B2 | 7/2014 | Faynberg et al. |
| 8,831,677 B2 | 9/2014 | Villa-Real |
| 8,832,857 B2* | 9/2014 | Court .................. H04L 63/1466 726/28 |
| 8,843,997 B1* | 9/2014 | Hare .................. H04L 63/0815 726/3 |
| 8,904,494 B2 | 12/2014 | Kindler |
| 9,077,758 B1 | 7/2015 | McGovern |
| 9,183,560 B2* | 11/2015 | Abelow .................. G06Q 10/10 |
| 9,374,369 B2 | 6/2016 | Mahaffey |
| 9,419,951 B1 | 8/2016 | Feisher |
| 9,426,183 B2 | 8/2016 | Shahidzadeh |
| 9,444,824 B1 | 9/2016 | Balazs |
| 9,503,452 B1* | 11/2016 | Kumar .................. H04L 67/306 |
| 9,510,320 B2 | 11/2016 | Reed |
| 9,602,508 B1* | 3/2017 | Mahaffey ............ H04W 12/084 |
| 9,613,257 B2 | 4/2017 | Phillips |
| 9,614,828 B1* | 4/2017 | Golwalkar ............ H04L 9/3234 |
| 10,325,259 B1 | 5/2019 | Shahidzadeh |
| 10,387,980 B1 | 7/2019 | Shahidzadeh |
| 10,511,590 B1* | 12/2019 | Bosch .................. H04L 45/306 |
| 10,904,240 B2* | 1/2021 | Bosch ................. H04L 63/0815 |
| 2003/0061111 A1 | 3/2003 | Dutta |
| 2003/0115142 A1 | 6/2003 | Brickell et al. |
| 2004/0155101 A1 | 8/2004 | Royer et al. |
| 2005/0044197 A1* | 2/2005 | Lai .......................... H04L 67/16 709/223 |
| 2005/0060584 A1 | 3/2005 | Ginter |
| 2005/0102530 A1 | 5/2005 | Burrows |
| 2006/0143231 A1* | 6/2006 | Boccasam .............. G06Q 10/10 |
| 2007/0011066 A1 | 1/2007 | Steeves |
| 2007/0033136 A1 | 2/2007 | Hu |
| 2007/0118891 A1 | 5/2007 | Buer |
| 2007/0156611 A1 | 7/2007 | Gupta |
| 2007/0262136 A1 | 11/2007 | Ou |
| 2008/0101283 A1 | 5/2008 | Calhoun |
| 2008/0196088 A1 | 8/2008 | Vinokurov |
| 2008/0222283 A1 | 9/2008 | Ertugral |
| 2009/0077163 A1 | 3/2009 | Ertugral |
| 2009/0097661 A1 | 4/2009 | Orsini |
| 2009/0132808 A1 | 5/2009 | Baentsch et al. |
| 2009/0259838 A1 | 10/2009 | Lin |
| 2009/0271847 A1 | 10/2009 | Karjala |
| 2009/0292927 A1 | 11/2009 | Wenzel |
| 2009/0307135 A1 | 12/2009 | Gupta |
| 2010/0199089 A1* | 8/2010 | Vysogorets ............. G06F 21/34 713/168 |
| 2010/0228996 A1 | 9/2010 | Ginter et al. |
| 2011/0035788 A1 | 2/2011 | White |
| 2011/0086612 A1 | 4/2011 | Montz |
| 2011/0093927 A1 | 4/2011 | Leppanen |
| 2011/0103265 A1* | 5/2011 | Dilipkumar Saklikar .................. H04L 63/0815 370/259 |
| 2011/0173017 A1 | 7/2011 | Salonen |
| 2011/0173448 A1 | 7/2011 | Baentsch et al. |
| 2011/0204142 A1 | 8/2011 | Rao |
| 2011/0209200 A2 | 8/2011 | White |
| 2011/0288996 A1 | 11/2011 | Kreutz |
| 2011/0296513 A1 | 12/2011 | Kasad |
| 2011/0307949 A1 | 12/2011 | Ronda et al. |
| 2012/0117157 A1 | 5/2012 | Ristock |
| 2012/0192260 A1 | 7/2012 | Kontsevich |
| 2012/0216244 A1* | 8/2012 | Kumar .................... G06F 21/57 726/1 |
| 2012/0330788 A1 | 12/2012 | Hanson |
| 2013/0007849 A1 | 1/2013 | Coulter |
| 2013/0047202 A1 | 2/2013 | Radhakrishnan |
| 2013/0047213 A1 | 2/2013 | Radhakrishnan et al. |
| 2013/0111549 A1 | 5/2013 | Sowatskey |
| 2013/0125226 A1* | 5/2013 | Shah .................. H04L 63/0815 726/7 |
| 2013/0174241 A1* | 7/2013 | Cha ......................... H04L 63/08 726/7 |
| 2013/0185205 A1 | 7/2013 | Boss et al. |
| 2013/0205133 A1 | 8/2013 | Hess |
| 2013/0305322 A1 | 11/2013 | Raleigh |
| 2014/0040975 A1 | 2/2014 | Raleigh |
| 2014/0189808 A1 | 7/2014 | Gupta |
| 2014/0189809 A1 | 7/2014 | Koved et al. |
| 2014/0189827 A1* | 7/2014 | Popovich ............ H04W 12/069 726/6 |
| 2014/0189834 A1* | 7/2014 | Metke ................ H04W 12/069 726/7 |
| 2014/0189840 A1* | 7/2014 | Metke ................ H04L 63/0884 726/9 |
| 2014/0282877 A1* | 9/2014 | Mahaffey .............. H04W 12/08 726/3 |
| 2014/0304795 A1 | 10/2014 | Bruno et al. |
| 2016/0087957 A1* | 3/2016 | Shah ...................... H04L 63/08 726/1 |
| 2016/0112397 A1* | 4/2016 | Mankovskii .......... H04L 63/105 726/6 |
| 2016/0119323 A1* | 4/2016 | Krishna .................. G06F 21/41 726/8 |
| 2016/0337863 A1* | 11/2016 | Robinson .............. H04W 4/021 |
| 2016/0366120 A1* | 12/2016 | Rykowski ........... H04L 63/0815 |
| 2016/0366121 A1* | 12/2016 | Rykowski ........... H04L 63/0815 |
| 2017/0034183 A1* | 2/2017 | Enqvist .................. G06F 21/552 |
| 2017/0126660 A1* | 5/2017 | Brannon ................ H04L 63/12 |
| 2017/0126661 A1* | 5/2017 | Brannon ............. H04L 63/0823 |
| 2017/0155640 A1* | 6/2017 | Rykowski ........... H04L 63/0815 |
| 2017/0339176 A1* | 11/2017 | Backer .................... H04L 67/22 |
| 2017/0372055 A1* | 12/2017 | Robinson ................ G06F 21/35 |
| 2018/0131685 A1* | 5/2018 | Sridhar .................. H04L 67/02 |
| 2018/0145968 A1* | 5/2018 | Rykowski ........... H04L 63/0815 |
| 2018/0152439 A1* | 5/2018 | Hande .................. H04L 63/083 |
| 2018/0262484 A1* | 9/2018 | Kesari .................... H04L 51/22 |
| 2018/0316657 A1* | 11/2018 | Hardt ...................... H04L 67/06 |
| 2018/0367526 A1* | 12/2018 | Huang .................. H04L 63/105 |
| 2019/0068578 A1* | 2/2019 | Balakrishnan .......... H04L 67/02 |
| 2019/0286806 A1* | 9/2019 | Robinson ................ G06F 21/35 |
| 2019/0332790 A1* | 10/2019 | Kukehalli Subramanya .................. H04L 63/10 |
| 2020/0026834 A1* | 1/2020 | Vimadalal ............. G06F 16/182 |
| 2020/0177386 A1* | 6/2020 | Mahmood ............. H04L 9/3239 |
| 2020/0252374 A1* | 8/2020 | Bosch ................. H04L 61/1511 |

* cited by examiner

CONTINUOUS AUTHENTICATION THROUGH ORCHESTRATION AND RISK CALCULATION POST-AUTHORIZATION SYSTEM AND METHOD

CROSS REFERENCE TO RELATED APPLICATIONS

This application claims priority to U.S. Patent Provisional Application No. 62/943,767, filed Dec. 4, 2019; which is hereby incorporated by reference in its entirety.

TECHNICAL FIELD

The subject matter disclosed herein generally relates to access, and in particular, post-authentication continuous authentication.

BACKGROUND

Digital transactions of a variety of types may stem not from a party authorized to enter into the transaction but by parties that are either unauthorized to enter into the transaction or threat actors and network bots who have acquired the means to enter into the transaction illegally from a hostile environment. For instance, a stolen credit card number or bank account access may be utilized to make fraudulent purchases or transactions-exchanges. A stolen or compromised password may be utilized to improperly access information or access to sensitives privileged services. Even conventional activities within an organization may be engaged in by an employee or member who does not have authorization to do so. It is equally important to validate not only the identity but the normality of behavior post-authorization by utilizing the context and behavior to create an enriched user profile within each application landscape.

SUMMARY OF THE INVENTION

Aspects of the disclosure include a method for secure authentication of a user entity identity comprising: a primary identity provider allows a user entity through a client device to enable a single sign on to a plurality of services; the primary identity provider collects the contextual and behavioral information of the user entity and the client device for access to at least one service of the plurality of services; delegates login and authentication process (including a risk based multi-factor authentication) to a third party Identity provider; the third party identity provider sends the contextual and behavioral information including at least one service identifier, a user identification, the client device, client device browser health, location, time, network, client device and client device browser fingerprint, and other attributes to the third party identity provider discrete risk engine; and conducts policy orchestration upon detection of anomaly of the at least one service and takes a predetermined action per policy and risk such as terminate the specific service and session or step up authentication using a new discrete multi-factor authentication.

BRIEF DESCRIPTION OF THE DRAWINGS

Some embodiments are illustrated by way of example and not limitation in the figures of the accompanying drawings.

In FIG. 5, browser and device inference is made in which user entity 102 behavior information, browser, user entity device 104 and client device 106 attributes are collected by the risk engine 110.

DETAILED DESCRIPTION

Figure 1:
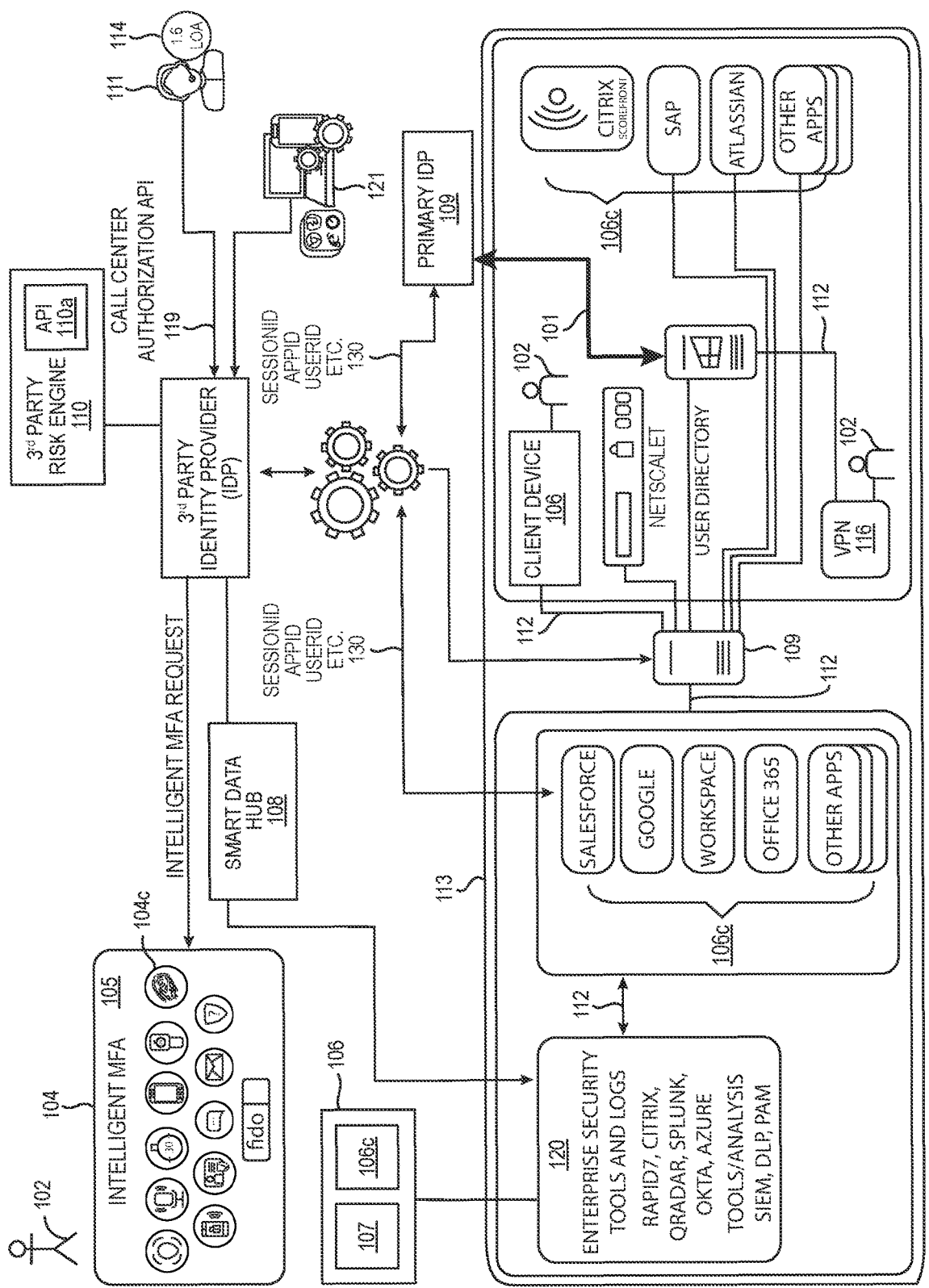
FIG. 1 illustrates a system and method 100 for secure continuous authentication of a user entity 102 to prevent fraud and other abnormal behavior.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Below are example definitions that are provided only for illustrative purposes in this disclosure below and should not be construed to limit the scope of the embodiments disclosed herein in any manner. Some terms are defined below for clarity purposes. These terms are not rigidly restricted to these definitions. These terms and other terms may also be defined by their use in the context of this description.

Acceptto Identity Trust Services's (AITS) ClientTrust Application Programming Interface (API) allows a relying party (RPs) (defined below) to query if the claimed identity (the identity of person who is making an attempt to login to a RP) is connected and determine if authentication request associated with claimed identity can be trusted. The API provides a level of assurance and contextual and behavior data associated with an online user. If the AITS API indicates that the claimed identity cannot be confirmed online or has a low level of assurance score then an appropriate step up authentication is enforced.

Active Session: a user entity 102 is attempting to and/or has validly logged into a relying party (RP) services application. Also, an active session can be the user entity device 104 and/or client device 106 session when logged into.

Allocentric: in the context of an authentication and/or a transaction, it is the other user entities, devices, applications and/or transactions within the overall system and method 100 in which access and transaction of interest are observed and not necessarily binded to the actual user entity 102 of interest transaction but the concurrent transaction present in the system 100. Good examples are observation of the traffic in a system independent of the initiated transactor by the actor of interest but other actors impacting the system load, traffic, application and microservices usage graphs and hence indirectly impacting the current transaction of interest. The current transaction of interest may be Transmission Control Protocol (TCP) synchronize (SYN), Internet Control Message Protocol (ICMP) and user entity datagram protocol (UDP) flooding, portscanning, payload signature of the system, number of transactions, data fingerprint, data consumptions, common internet protocols (IPs), and abnormal vs normal behaviors of transactions other than current subject and context of transactions of interest. Allocentric may be compared to egocentric defined below which looks at only the user entity 102 relationship with the network 112 and system 100.

Application: software used on a computer (usually by a user entity 102 and/or client device 106) and can be applications (104c, 106c) that are targeted or supported by specific classes of machine, such as a mobile application, desktop application, tablet application, and/or enterprise application (e.g., user entity device application(s) 104c on user entity device 104, client device application(s) 106c on a client device 106). Applications may be separated into applications which reside on devices 104 or 106 (e.g., VPN, PowerPoint, Excel) and cloud applications which may reside in the cloud (e.g., Gmail, GitHub, Salesforce). Cloud applications may correspond to applications on the device or may be other types such as social media applications (e.g., Facebook).

Application Identity Information: means, for a website, mobile or desktop application, or other service needing authentication or authorization, the Application Identity Information may be a uniform resource locator (URL), package name of a hosting application, signing certificate of hosting application, class name or other identifier of current user interface (UI) dialog, a universally unique identifier (UUID), a hash of the application or site code, a digital signature or key-hashing for message authentication (HMAC) provided by the application, or other information that can be used to fingerprint software (e.g., class name of running service or activity).

Artificial Intelligence: computer system(s) able to perform tasks that normally require human intelligence, such as visual perception, speech recognition, decision-making, and translation between languages.

Attributes: unique identification information associated with a user entity 102, user entity device 104 and/or client device 106 (defined below) such as biometric information, habits, spatiotemporal data, location, behavior, browser and/or network 112 context. Habits of the user entity 102 may be both physical and logical including applications used (104c, 106c) and data usages.

Audit Log: a standard for message logging which allows separation of the software that generates messages, the system that stores them, and the software that reports and analyzes them.

Authentication: determines whether users are who they claim to be by providing a proof of identity method. Authentication Assurance is the degree of confidence reached in the authentication process that the communication partner (human or machine) is the user entity 102 that it claims to be or is expected to be. The confidence may be based on the degree of confidence in the binding between the communicating user entity device 104 and the user entity 102 identity that is presented.

Authorization: determines what users can and cannot access and is typically post authentication. Authorization is an indication (e.g., yes/no, true/false) of whether the action is allowed or a token that grants access or is proof of allowance of an access, and which can be provided to system and method 100 which requires proof that a given user entity 102 is authorized for a particular action, or a callback to the system 100 indicating that the user entity 102 is authorized.

Biobehavioral Derived Credential: a derived credential that is drawn from a combination of human biological features, behavioral activities and digital-logical habits of the claimed identity of a digital consumer such as a user entity 102.

Claimed Identity: until verified any presented credential such as user entity 102 identity and credentials such as a password or other methods are classified as claimed identity (versus confirmed identity which is a post successful authentication).

Computer (e.g., user entity device 104, client device 106, risk engine 110, replying party server 113): may refer to a single computer or to a system of interacting computers. A computer is a combination of a hardware system, a software operating system and perhaps one or more software application programs. Examples of a computer include without limitation a laptop computer, a palmtop computer, a smart phone, a cell phone, a mobile phone, an IBM-type personal computer (PC) having an operating system such as Microsoft Windows®, an Apple® computer having an operating system such as MAC-OS, a server, hardware having a JAVA-OS operating system, and a Sun Microsystems Workstation having a UNIX operating system.

Contextual Identifiers (or Contextual Factors): may be part of the verification process of a user entity 102 and/or client device 106 and may include the following multi-factors used singularly or in different combinations: location, biometrics (e.g., heartbeat monitoring, iris recognition, fingerprint, voice analysis, and deoxyribonucleic acid (DNA) testing), user entity 102 habits, user entity 102 location, spatial information, user entity 102 body embedded devices, smart tattoos, dashboard of the user entity 102 car, the user entity 102 television (TV), the user entity 102 home security digital fingerprint, facial recognition (e.g., faceprint), Domain Name System (DNS), type of user entity device 104, client device, user entity device browser 105 context, client device browser 107 context, network 112 context, remote access Virtual Private Network (VPN), client device application 106c usage and habits, user entity device application 104c usage and habits, data sharing, access fingerprint and the like.

Credentials: may take several forms, including but not limited to: (a) personally identifiable user entity 102 information such as name, address, birthdate, etc.; (b) an identity proxy such a user entity 102 name, login identifier (e.g., user entity name), or email address; (c) some biometric identifiers such as fingerprint, voice, or face; (d) an X.509 digital certificate; (e) a digital fingerprint and approval from a binded user entity device 104; (f) behavioral habits of a user entity 102 or user entity device 104 in physical or cyber space; and/or (g) behavior of network 112 and applications 104c, 106c at the time of user entity device 104 interface with the application and network 112. The term "credential" or "credentials" means something that is provided as a correct response to a given authorization challenge, such as a user entity 102 name/password, token, or similar data element or object as described in more detail in the description that follows.

Device: means hardware, software or a combination thereof. A device may sometimes be referred to as an apparatus. Each device is configured to carry out one or more steps of the system and method 100 described herein and may be used for large-scale behavioral targeting.

Egocentric (as opposed to Allocentric discussed above): in the context of both physical and cyber transactions is the relation of user entity 102, user entity device 104, client device 106 and/or an application (104c, 106c) used by or on these devices to the overall system and method 100. In an egocentric analysis, context may be network 112 attributed, overall traffic on the network 112, a data signature and/or transactions relative to each of the user entity 104 and client device 106.

Engine: the term "engine" is used herein to indicate software components an order of magnitude more complex than ordinary modules of software (such as libraries, software development kits (SDKs), or objects). Examples of software engines include relational database engines, workflow engines, inference engines and search engines. A common characteristic of software engines is metadata that provides models of the real data that the engine processes. Software modules pass data to the engine, and the engine uses its metadata models to transform the data into a different state.

Fingerprinting: collection of Attributes that help identify the authentic user entity 102, user entity device 104 and/or client device 106.

Heartbeat: when the user entity's computers send regular reports on their security status to the monitoring computer to determine whether the user entity 102 is still on the network 112, is valid and should still allowed to be on the network 112.

Identity Assurance: the degree of confidence in the process of identity validation and verification used to establish the identity of the user entity 102 to which the credential was issued and the degree of confidence that the user entity 102 that uses the credential is that user entity 102 or the user entity 102 to which the credential was issued or assigned.

Level of Assurance (LOA): a level of confidence for identity proofing with respect to the binding between level of access for a user entity 102 and the presented identity information. The level of assurance is a required level of trust (i.e., threshold) to allow access to a service. An example of LOA is dynamic *LOA* which is capable of increasing or decreasing within a session. The concept of Level of Assurance was described in U.S. Pat. No. 9,426,183, filed on Jul. 28, 2014; U.S. Pat. No. 10,325,259, filed on Mar. 18, 2015; U.S. Pat. No. 10,387,980, filed on Jun. 6, 2016; and U.S. Pat. No. 10,824,702, filed on Jul. 24, 2020; each of these patents assigned to Applicant and each patent hereby incorporated in their entirety by reference.

Level of Assurance Provider (LOA Provider): may be a mobile or stationary device (e.g., user entity device 104, client device 106) associated with the user entity 102 and registered with risk engine 110 (e.g., LOA Server or located on a relying party 113 server) and configured to confirm (or decline) a transaction authorizing access to elevated relying party services. Alternatively, the LOA Provider may be a user entity 102 (e.g., human) who provides the biometric information or decision to approve or decline through the user entity device 104 (or client device 106) via collection of methods and credentials.

Machine learning: an application of artificial intelligence (AI) that provides computer systems the ability to automatically learn and improve from data and experience without being explicitly programmed.

Modules: may constitute either software modules (e.g., code embodied on a machine-readable medium or in a transmission signal) or hardware modules. Certain embodiments are described herein as including logic or a number of components, modules, or mechanisms. A "hardware module" (or just "hardware") as used herein is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as an FPGA or an ASIC. A hardware module may also include programmable logic or circuitry that is temporarily configured by software to perform certain operations. A hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access.

Network (112): means any combination of electronic networks, including without limitation the Internet, a local area network (LAN), a wide area network, a wireless network and a cellular network (e.g., 4G, 5G).

Network Security Policy (or Policy): rules for computer network access which determines how policies are enforced and lays out some of the basic architecture of the security/network security environment of system and method 100.

Out of Band Notification: one form of two-factor or multi-factor authentication that requires a secondary sets of verification method through a separate communication channel(s) along with an identification and password.

Processes (or Methods): some portions of this specification are presented in terms of processes (or methods) or symbolic representations of operations on data stored as bits or binary digital signals within a machine memory (e.g., a computer memory). These processes or symbolic representations are examples of techniques used by those of ordinary skill in the data processing arts to convey the substance of their work to others skilled in the art. As used herein, an "process" is a self-consistent sequence of operations or similar processing leading to a desired result. In this context, processes and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information.

"Processor-implemented Module": a hardware module implemented using one or more processors. The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein.

Real Time: the time associated with authorization periods described herein which range depending on the type of transaction, need and urgency for authorization. The authorization time periods may vary from under 10 seconds to 24 hours or more. Real time authorization as used herein prevents fraud at its inception versus mitigating it in a post event notification. In one implementation, real time may refer to the time for the transaction to complete.

Refresh: periodically, an LOA Server will perform a "refresh" to update at least some of the plurality of verified attributes and the verified credentials based on predetermined policies and on demand from the RP Server. For example, refresh can be a time based or policy or rule based reconnection of a LOA Provider to the LOA Server to say that a remote secure password is renewed or changes.

Relying Party 113: could be an entity in multiple sectors requiring secure interactions such as financial institutions, healthcare, airport operators, Transportation Safety Administration (TSA), hotel operators, retailers, education institutions, government agencies and associated social services, social networks, websites, and the like. A relying party 113 will typically use a server (i.e., the Relying Party Server) as a manifestation of its intentions. "Relying Party" and "Relying Party Server" shall be used interchangeably herein.

Relying Party (RP) Services: may typically be any web or on-premises service requiring approval for access with dynamic different levels of assurance within. Relying Party Services can be any transaction including authorized login such as Web or on-premise log-in; Virtual Private Network (VPN) log-in; transaction monitoring; financial transaction for online or a point of sale (such as the dollar amount, type of transaction including check versus wire versus cashier check); a workflow for approving, viewing or modifying data on a server; access to confidential versus restricted data; and physical access control to a building or secure space. Relying Party Services can be an application (i.e., Relying Party (RP) Services Application) and/or application programming interface (API) residing on a user entity device 104 and/or client device 106; be part of an RP Server 113; and/or be located at a separate server. In addition, an RP Service may be an application executing on a user entity device 104 and/or client device 106 and connected to the RP Server(s) and/or located at a separate server, wherein the RP Server(s) and/or separate server provides the data and executables for providing the service through the application. In addition, as discussed below, an RP service may include concierge services.

Security Assertion Markup Language 2.0 (SAML 2.0): an extensive markup language (XML)-based framework for authentication and authorization between user entity devices 104 and/or client devices 106.

Security Information and Event Management (SIEM): is the aggregate security information management and security event management functions into one system to collect relevant data from multiple sources, identify deviations from the defined norms and provide an early warning or even take appropriate action as needed to inform enterprise information security and information technology (IT) experts of a possible threat during an event or post an event.

Significant Events: a defined normal (or abnormal) event of interest defined by the policy engine 110a of a risk engine 110 or through the artificial intelligence/machine learning (AIML) cognitive engine 330 that can trigger a condition of interest. The condition of interest may demand a change in the level of assurance (i.e., dynamic LOA) required in real-time during an active session to initiate a need for response to authenticate, authorize, audit or even deny service where appropriate.

Server: means a server computer or group of computers that acts to provide a service for a certain function or access to a network 112 resource. A server may be a physical server, a hosted server in a virtual environment, or software code running on a platform.

Service (or application): an online server (or set of servers), and can refer to a web site and/or web application.

Software: is a set of instructions and its associated documentations that tells a computer what to do or how to perform a task. Software includes all different software programs on a computer, such as applications and the operating system. A software application could be written in substantially any suitable programming language, which could easily be selected by one of ordinary skill in the art. The programming language chosen should be compatible with the computer by which the software application is to be executed and, in particular, with the operating system of that computer. Examples of suitable programming languages include without limitation Object Pascal, C, C++, CGI, Java and Java Scripts. Further, the functions of some embodiments, when described as a series of steps for a method, could be implemented as a series of software instructions for being operated by a processor, such that the embodiments could be implemented as software, hardware, or a combination thereof.

Spatiotemporal Velocity: user entity 102 transaction, access and login inference based on time and location and scoring based on proximity, distance of travel and time feasibility.

Third Party Identity Provider with Risk Engine 110 (or Third Party Secondary (or Chained) Identity Provider with Risk Engine): a server (or servers) that provides a continuous identity verifier service and may be a Machine2Machine (M2M) server. The risk engine 110 may be part of the same server as a relying party server 113 or located in a separate server at the same or a remote location. (e.g., Acceptto eGuardian® server and also known as an LOA Server or Identity Provider). The third party identity provider with risk engine 110 may alternatively be referred to as just the "risk engine" 110 herein.

Threat Actor (or Bad Actor): a human or machine attempting to gain unauthorized access to a network 112, a user entity device 104 and/or client device 106.

Token: an electronic software access and identity verification device used in lieu of or with an authentication password.

Trusted Device: a known user entity device 104 or client device 106 (or their browsers 105 and 107) over which an organization has some control and can assume some level of basic security. Typically, the user entity device 104 and client device 106 feature a software agent that directs traffic to the corporate network so basic security checks such as a passcode and up-to-date operating system (OS) can be done. Once these checks are completed, a trusted device will usually receive unrestricted network access so the user entity 102 can retrieve all the information they need to work remotely.

Trust score (or Risk Score) 114: a score set by system and method 100 to determine whether a user entity 102 seeking access is a threat. The trust score is an aggregate of confidence in the active session. (In comparison, the Level of Assurance (LOA) is the required level of trust for a requested action). A trust score for a threat shall be determined by combining user entity 102 data, user entity device 104 data and client device 106 data. Various vectors, behavioral patterns and biometric data (e.g., fingerprint, face identification) from the user entity 102 are combined and converted to a trust score 114. A version of trust score may also be passed to a relying party 113 through a call center API 111 as discussed herein.

User Entity 102: may be a consumer, entity, machine entity, user entity agent, client, client agent, subscriber, requesting agent and requesting party and may be human or machine.

User Entity Device 104: may be any device associated with a user entity 102.

FIG. 1 illustrates a system and method 100 for secure authentication of user entity 102 and user entity device 104 and/or client device 106 identity. The system and method 100 involve passing the user entity 102 contextual and behavioral information to a third party identity provider (IDP) with a risk engine 110 (or third party secondary (or chained) identity provider with a risk engine) to allow risk based continuous authentication and step up post-authorization authentication or termination of session as required upon detection of an anomaly (or a plurality of anomalies).

FIG. 1 illustrates a user entity 102, user entity device 104 having a user entity device browser 105, a client device 106 having a client device browser 107, a smart data hub (or data ingestion hub) 108, primary identity provider 109, third party identity provider with risk engine 110, a network 112 and relying party 113. Client device 106 may be a computer desktop, server, laptop, and/or a mobile device and may be located at the site of the relying party 113 or remotely.

Figure 2:
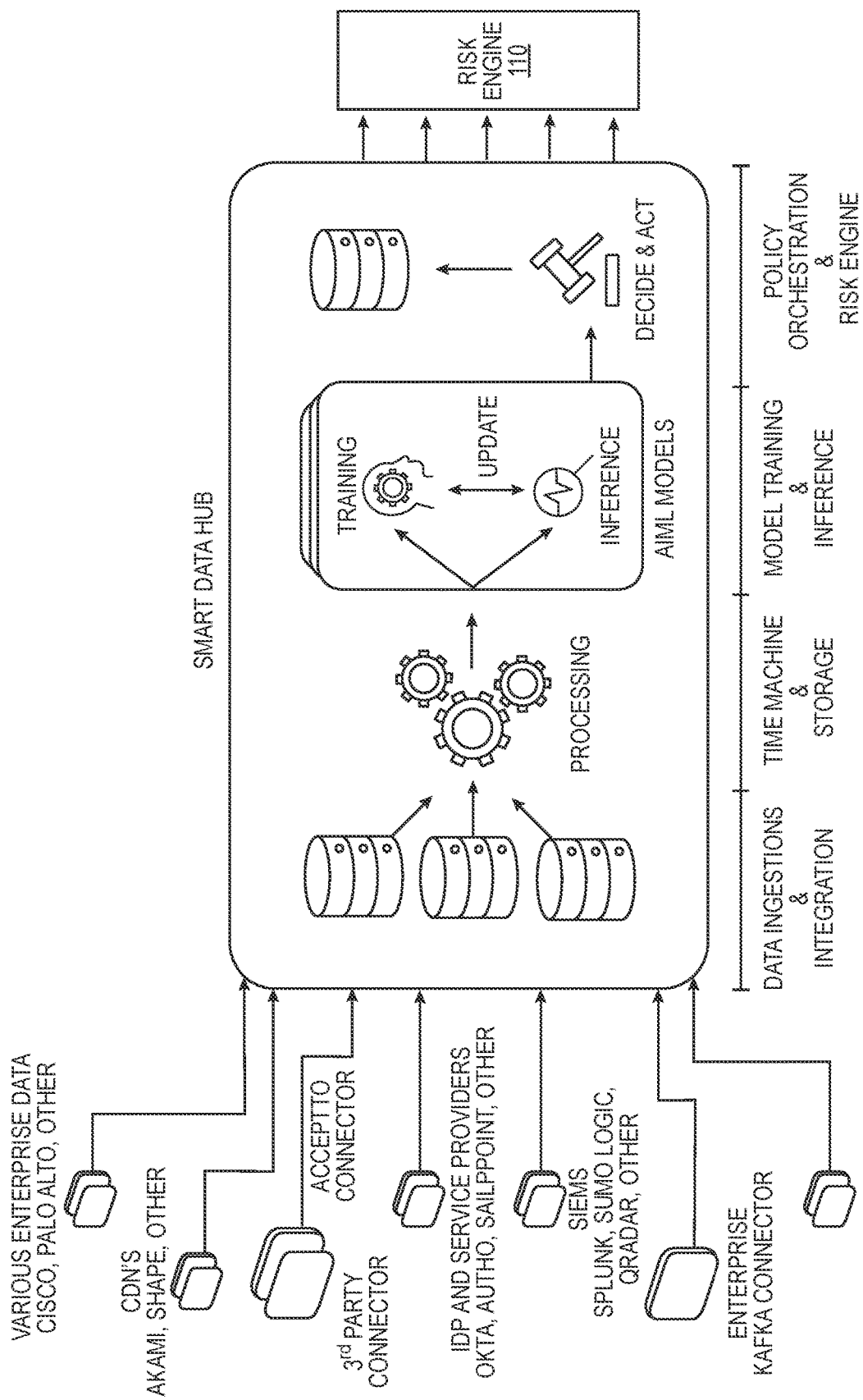
FIG. 2 illustrates a smart data hub 108 to be used in system and method 100.

FIG. 2 shows the details of the smart data hub 108. Primary identity provider (primary IDP) 109 is a universal provider of services (or applications) to typically a large relying party 113 (such as a Fortune 500 company). The primary identity provider 109 will provide authentication and authorization for user entities 102 and corresponding user entity devices 104 and/or client devices 106 trying to access a network 112 and the services belonging to the relying party 113. Relying party 113 may be a large corporation which requires user entities 102 (e.g., employees) to access a plurality of services (or applications) 106c as part of their employment. The role of the secondary third party identity provider with risk engine 110 is to provide post-authorization, continuous authentication using a risk engine to detect anomalies and step up or re-authenticate user entities 102 for the relying party 113. The third party identity provider with risk engine 110 may be "chained" to the primary identity provider 109. This system and method 100 allows user entities 102 to avoid having to constantly perform multi-factor authentications every time they want to access a new service or application. In an alternative embodiment, the primary identity provider 109 and the third party identity provider with risk engine 110 could be the same and perform the same functions as described herein. Third party identity provider with risk engine 110 (e.g., an eGuardian® server(s)) monitors and operates with and in parallel to the user entity device 104, client device 106 and smart data hub 108. Risk engine 110 tracks all activities associated with the operation of the system and method 100 including that of the user entity device 104, client device 106 and/or smart data hub 108. The risk engine 110 may be located on site of a relying party 113 or at a remote location. Call Center Application Programming Interface (API) 111 associated with call center 111 resides on user entity device 104, client device 106, smart data hub 108 and/or risk engine 110. The risk engine 110 may be constantly monitoring the user entity 102 through its user entity device 104 and/or client device 106 or applications 104C or 106C. Risk engine 110 will analyze both the biometric inputs from the user entity 102 and the behavior of the user entity 102 to determine whether a relying party 113 is dealing with an authenticated user entity 102 or some type of anomaly which would indicate possible nefarious activity such as fraud.

Figure 5:
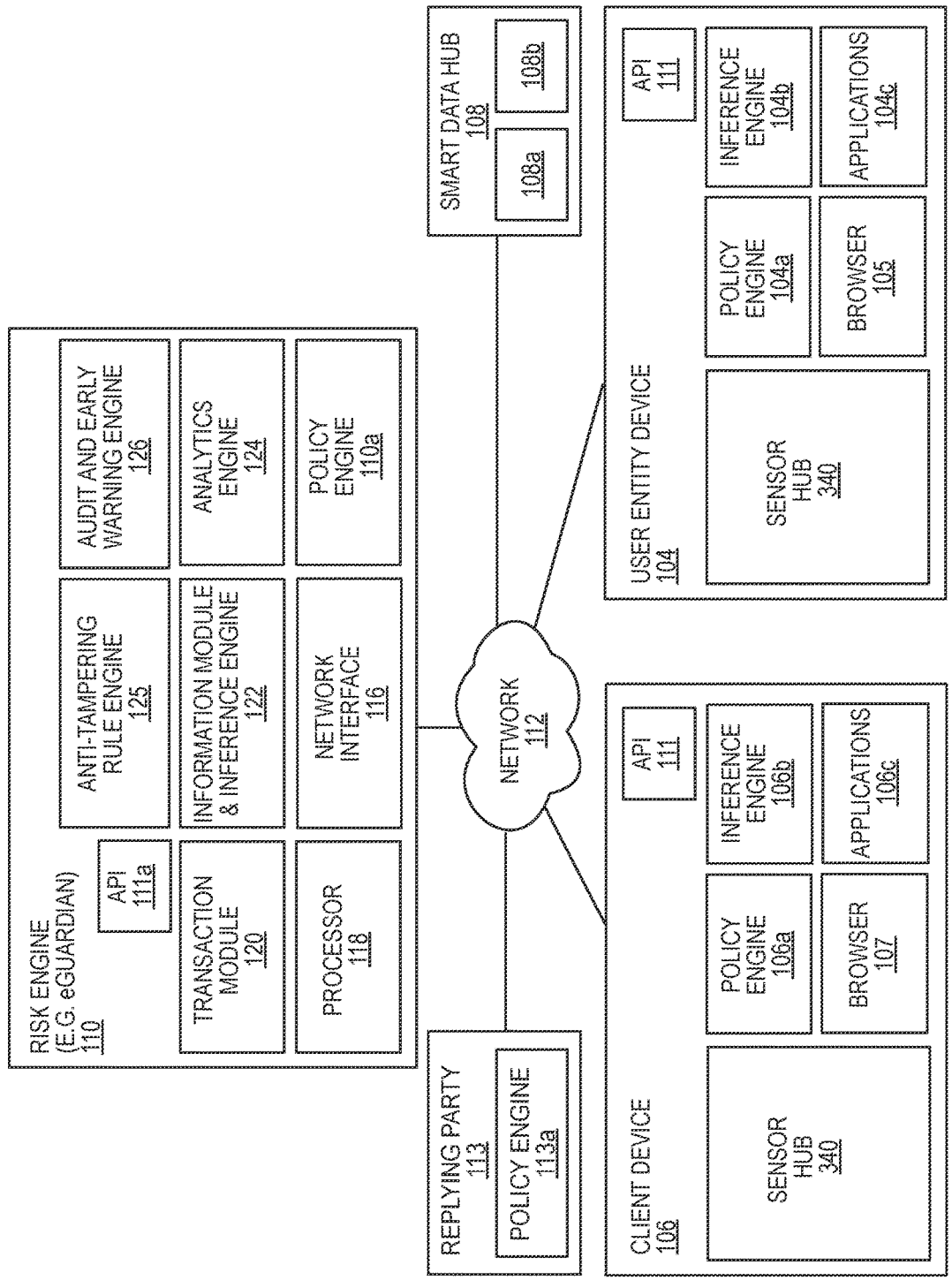
FIG. 5 illustrates a simplified view of system and method 100 including a user entity device 104, client device 106 and risk engine 110.

Call Center API 111 and omnichannel platform 121 communicate with third parties such as a relying party 113 (e.g., large corporation, hotels, airports, banks and bank ATMs) and the third party identity provider with risk engine 110. The Call Center API 111 and omnichannel platform 121 allow communications both inward and outward, performs analytics, and provides a trust score (or safety rating) 114 to a relying party 113. In addition, the API 111 will provide secure communications with the risk engine 110. The Call Center API 111 may communicate using a secure communication link (e.g., encrypted) 112 with the third party IDP with risk engine 110 (e.g., an API 110a that resides at the risk engine 110) either through push, email, text and/or voice, biometric or other. Call Center API 111 and an API 110a at risk engine 110 may use Transport Layer Security (TLS) encryption which is a standard that keeps a network 112 connection private and checks that the data sent between the Call Center API 111, risk engine API 110a, and/or the relying party 113 is encrypted and unmodified. The risk engine API 110a requires a trust score 114 of the user entity 102 to meet a level of assurance (LOA) (e.g., 1.6 as shown in FIG. 1) before it will allow access. The level of assurance is dynamic and will change depending on the situation. The system and method 100 allows for continuous authentication to provide access to predetermined applications 104c, 106c (e.g., third party applications or services) as shown in FIG. 5. These third party applications 104c and 106c may communicate with a relying party (RP) server 113 having its own policy engine 113a. The risk engine 110 maintains the level of assurance of the system and method 100. The risk engine 110 provides continuous behavioral authentication at every stage of a trusted device (e.g., user entity device 104 and/or client device 106) interaction with the network 112 and relying party 113 including access to, transactions with and/or changes in level of assurance (LOA) throughout an active session for applications and services 104c and 106c. The risk engine 110 keeps track of user entity 102 behavior, network 112 traffic (both in an allocentric and an egocentric manner), user entity device 104 behavior, client device 106 behavior, smart data hub 108 behavior and user entity 102 habits and associated transactions. In addition, the risk engine 110 may obtain ambient intelligence from other devices such as Internet of Things (IoT) devices connected to the network 112 and third party data to help classify each transaction risk collectively and look for abnormal behavior by a threat actor trying to behave as a user entity 102. Based on this information, the risk engine 110 continuously maintains and updates a trust score 114 for a user entity device 104 (and/or client device 106) to see if it matches the required level of assurance (LOA) for access to a service offered by the relying party 113. This allows the system and method 100 to deliver cognitive continuous authentications for each session and the transactions within and to classify anomalies and calculate risk at all stages within an active session of applications/services 104c and 106c.

The system and method 100 disclosed herein enable a risk engine 110 to build a predictive analytics engine 124 (shown in FIG. 5) delivering a dynamic level of assurance (LOA) technique. As discussed above, the level of assurance (LOA) is a level of confidence for identity proofing for the binding between level of access for a user entity 102 and the presented identity information. Dynamic LOA means the third party IDP with risk engine 110 is capable of adjusting the level of assurance up and down in an active session.

The system and method 100 disclosed herein reduces difficulties (i.e., friction) in gaining access to applications for legitimate user entities 102, elevates trust in platform exchanges and injects preventive flows and measures when encountering potential threat actors. The Call Center API 111 is also able to reside on user entity device 104 (and/or client device 106) to deliver an end-to-end solution feeding an analytics and early warning system. The user entity device 104 and/or client device 106 may be a particular, designated electronic, computational, and/or communication device associated with a user entity 102 who will be seeking access to a system through network 112. The user entity device 104 and/or client device 106 may be registered to (and binded to) a particular user entity 102. The user entity device 104 may be any communication device (including wireless devices) that can receive and transmit messages and conduct transactions. User entity device 104 may be in the form of a mobile device which also may have a user entity device browser 105 (e.g., smart phone such as Apple® iPhone®). The user entity device 104 may also be a smart device such as a watch, ring or fitness device. Alternatively, the user entity device 104 may incorporate or function on multiple electronic devices or may be any of a variety of electronic devices that a user entity 102 happens to be using at the time. The user entity device 104, client device 106 or a module that is embedded within the user entity device 104 or client device 106 may have a user identity proofing component such an embedded biometric service, feature or capability. These identity proofing components may include voice, face, fingerprint, walking gait, and other unique identifiable biometrics that may be decentralized using various sensory solutions that can uniquely identify the user entity 102 and their associated login or transaction. By connecting the user entity 102, user entity device 104, user entity device browser 105, client device 106, client device browser 107 and/or smart data hub 108 habits to the contextual data used in the threat actor analysis it is possible to model user entity 102 normal behavior and detect abnormalities. In certain instances, the user entity device 104 and/or client device 106 may be a mobile device or laptop that is either issued or trusted by the workplace or booking relying party 113 to gather user entity 102 behavior information. The user entity device 104 and/or client device 106 may have a mobile device manager (MDM) installed to ensure certain policies associated with the use of the user entity device 104 and/or client device 106.

Device identification (ID) of device 106 and context of applications (or services) 104c and 106c such as AppID, Session ID, and/or SamIID are passed to third party IDP 110 who then signals the primary IDP 109 to take actions including termination of session, step-up authentication, or passive authentication (i.e., a form of step-up but automatically approved when the level of assurance (LOA) score is met) for the identified apps 104c and 106c with the associated AppID, SessionID, and SAMLID. Also, action is taken if such on-premises services and cloud services 104c or 106c are detected to have abnormal behavior at authentication or post authorization or in cases if the user entity device 104 or client device 106 security postures have changed or the context of authenticator user device 104 and therefore the user 102 posture has changed. Such detection of risk detected by the third party IDP service provider with risk engine 110 is to prompt a change in the level of assurance that is calculated by risk engine 110. Risk engine 110 uses data from third party IDP and relying party 113 system including the third party data hub 108 and existing data sources of relying party 113 such as data logs (i.e., 108xchg) using various components of smart data hub 108.

Client device 106 may be in the form of a desktop personal computer, server, or laptop having a client device browser 107 and discrete or integrated client device applications (or services) 106c for connectivity, communication, data exchange and other services. The client device 106 may be another device upon which the user entity 102 is operating and may be capable of performing client device applications 106c. The client device 106 may be any suitable electronic, computational, and/or communication device for conducting transactions, such as a mobile device (e.g., iPhone), cloud device (e.g., iCloud), desktop computer, cash register, kiosk, order terminal, electronic lock, automobile lock, payment processing and point of sale device. The client device 106 may also be any location or device on which a user entity 102 may seek access to a client device 106, an electronic location, a secure facility, user entity 102 information, or other location or item having restricted access. Therefore, while such a client device 106 may have a user entity 102 input, such as a keyboard or keypad, the user entity 102 input terminal would not necessarily have the capacity to display messages to a user entity 102 attempting to enter into a transaction. In certain embodiments, the user entity 102 may be an employee, for example, of a government agency, a pharmaceutical or health provider company, a financial institution, or an enterprise with privileged access to highly sensitive assets, data or a client of all of the above. In such instances, the user entity 102 is pre-authorized and trusted with certain access permissions and credentials such as user entity 102 name and password and other additional factors and credentials to access the network 112 or services.

The third party identity provider with risk engine 110 may be used to identify user entity 102, user entity device 104, user entity device browser 105, client device 106, client device browser 107 and smart data hub 108 behavior unique attributes. The risk engine 110 will store and later match against a database to infer change upon subsequent transactions and measuring transaction risk through a search and match against classified set of static and dynamic attributes. The idea of the behavior of the user entity 102, user entity device 104, user entity device browser 105, client device 106, and client device browser 108 and their browser fingerprints in general is for the risk engine 110 to identify legitimate traffic and obtain indication of correct flow signature on progression of visiting a portal or web page. This is compared to the backdoor application programming interface (API) techniques that threat actors use given they are aware that they are being fingerprinted in their path. User entity device 104 and client device 106 may collectively gather data based on the user entity 102 behavior and create or augment a behavior based identity for the user entity 102. In one embodiment, the collection or gathering of data may be performed using a secure operator application installed on the user entity device 104 and/or client device 106.

The third party identity provider with risk engine 110 may, in various examples, be Machine to Machine Digital Key Authentication (M2M-DKA) servers and may utilize a secure communication protocol over network 112 (as discussed above). The risk engine 110 of system and method 100 generally, may provide an integrated per user entity 102 contextual pattern detection for a network 112, user entity device 104, client device 106, secure facility operator, a relying party 113 and/or the customers enabling transparency and detection of attacks and leakage of secure information. Risk engine 110 may be used to identify user entity device 104, user entity device browser 105, client device 106, client device browser 107 and behavior unique attributes, storing and later matching to infer change upon consequent transactions and measuring transaction risk through a search and match against classified set of static and dynamic attributes using user entity device 104, user entity device browser 105 finger print, client device 106, client device browser 107 and their browser traffic, and user entity device inference engine 104b and client device inference engine 106b.

A user entity 102 can use either user entity device 104 or client device 106 separately or at the same time. Both user entity device 104 and client device 106 are coupled to the third party identity provider with risk engine 110. The user entity 102 behavior patterns (e.g., habits) with user entity device 104 and client device 106 and applications 106c and services embedded or added and attributes of the user entity device 104 and client device 106 can all be measured by the risk engine 110. Recording these attributes creates a "normal" risk threshold which is used in the creation of the trust score 114. The user entity device 104 and/or client device 106 collectively gather data based on user entity 102 behavior such as flow of use of applications (104c, 106c), micro services within the applications (104c, 106c), data usage, and in general the egocentric versus allocentric behavior of the user entity 102. The risk engine 110 creates or augments a behavioral based identity for the user entity 102 by graphing the patterns of the user entity 102 of interest, user entity device 104, client device 106, and pattern of applications (104c, 106c) and data used by the user entity 102. By graphing predictable events, the risk engine 110 can determined which events are predictable and which are not. In one embodiment, the collection or gathering of user entity 102 behavior data may be performed using a secure operator application (104c, 106c) installed on the user entity device 104 and/or client device 106. Components of the system and method 100 of the present embodiments include: i) user entity device 104 data; ii) behavior inference using both user entity device 104, user entity device browser 105, client device 106 and client device browser 107; and iii) portal device and browser finger printing combined which enables an assembly of data about the user entity 102 and its user entity device 104 and client device 106. The data is captured for real-time and post analytics in the risk engine 110 and hence unleashing the power of predictive analytics to prevent fraud.

The network 112 may include or be accessed by WiFi, Bluetooth, radio-frequency identification (RFID), near field communications (NFC), fourth generation long term evolution (4G-LTE) cellular, fifth generation (5G) cellular and similar communication technologies. The network 112 may be accessed through a secure website.

Figure 3:
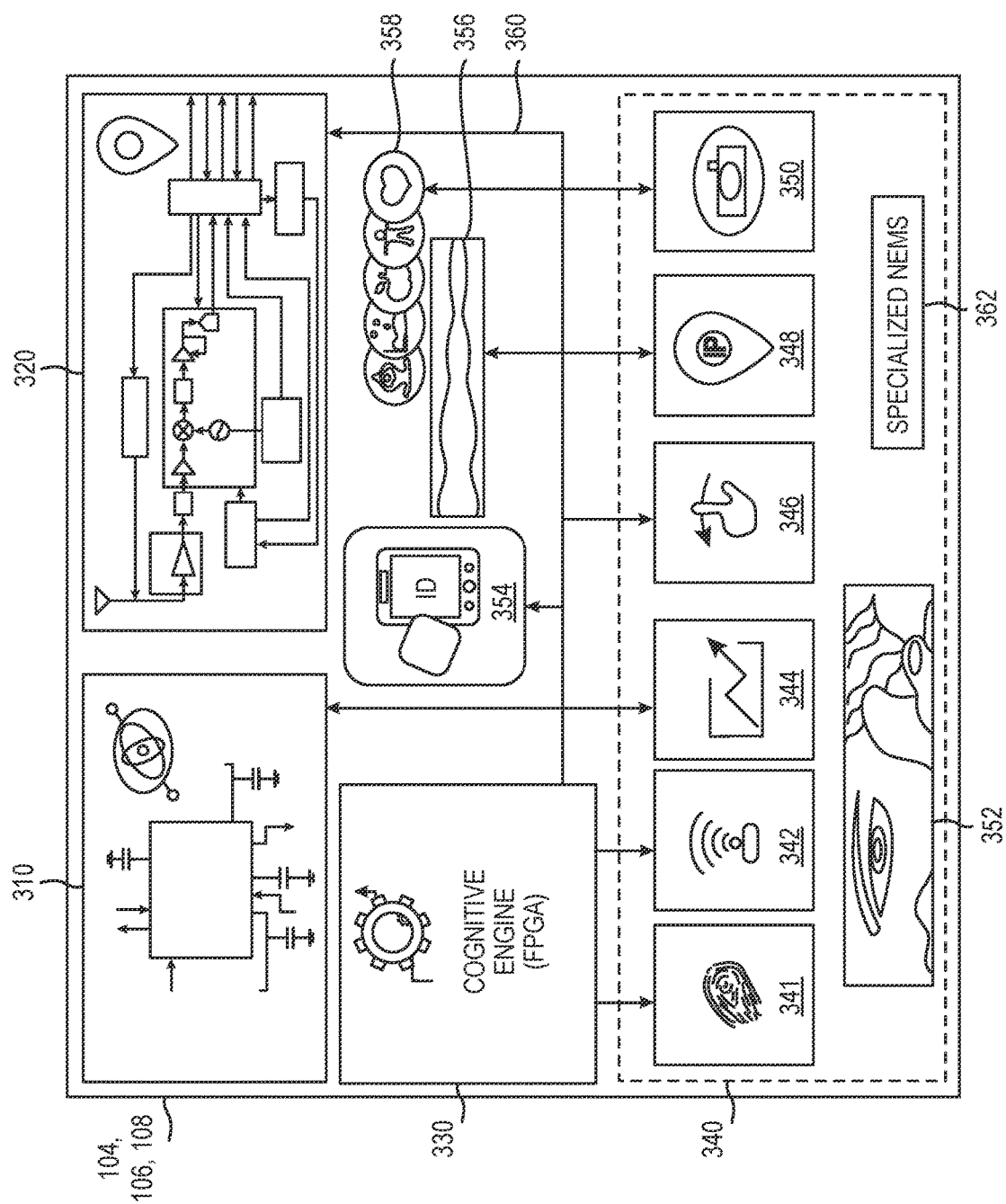
FIG. 3 shows that the user entity device 104, client device 106 and smart data hub 108 may include transceiver equipment of a modern smartphone such as a gyroscope 310 and a global positioning satellite (GPS) 320 and can track the behavior and habits of user entity 102.
Figure 4:
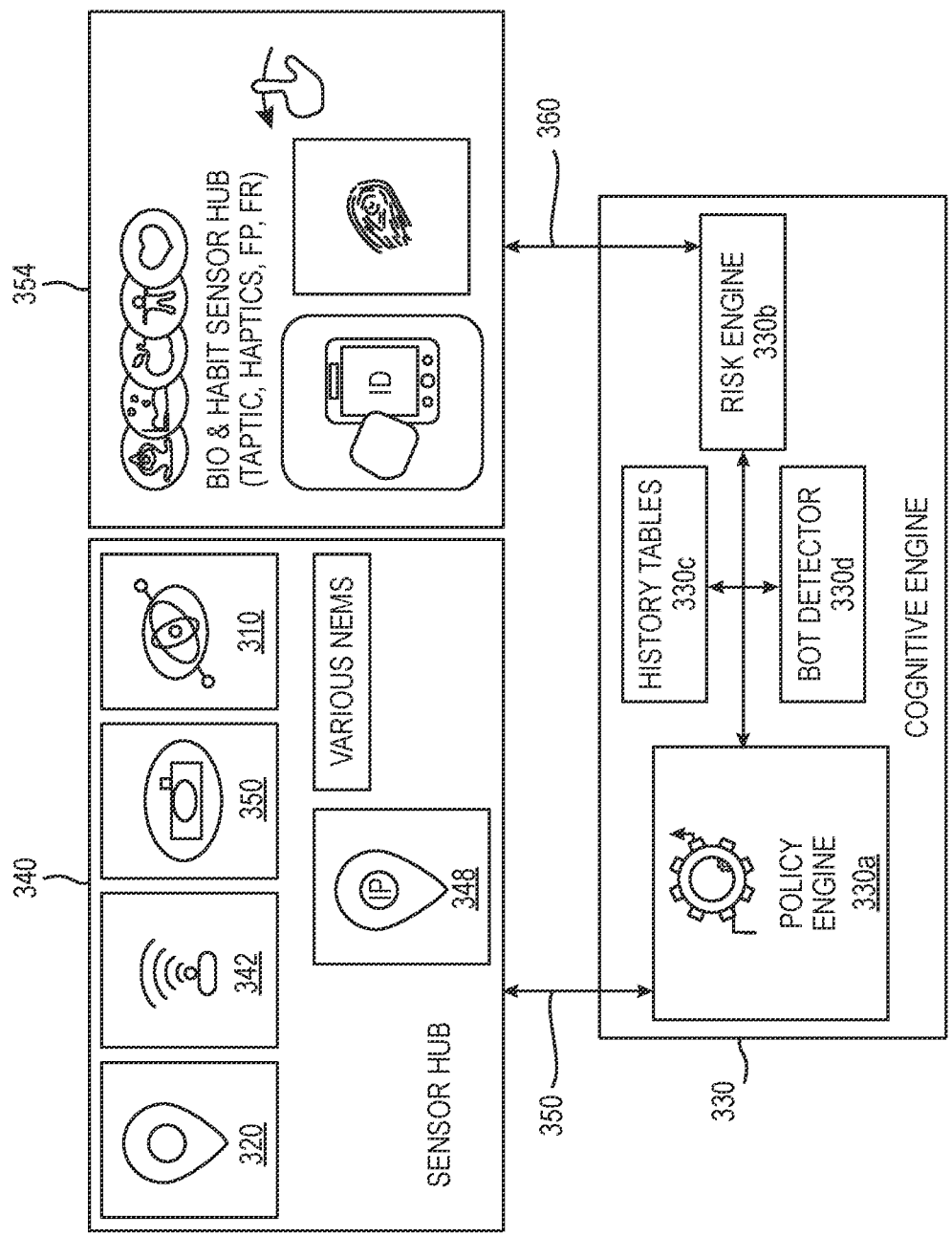
FIG. 4 illustrates more details of a cognitive engine 330 and sensor hub 340 that are part of the user entity device 104, client device 106 and smart data hub 108.

FIGS. 3 and 4 illustrate an example of a user entity device 102, client device 106 and/or smart data hub 108 that may be used with the system and method 100. The user entity device 104, client device 106 and smart data hub 108 can each separately have all or some predetermined subset of components and functionalities as described below. User entity device 104 may be a wireless device with integrated compute capabilities, sensors and at least one field programmable gate array (FPGA) that is programmed with customized biobehavioral compute technology and customized nano-electromechanical systems (NEMS). The user entity device 104 may be a laptop computer, cellphone, smartphone (e.g., Apple® iPhone®), a wireless user entity digital assistant, wireless tablet (e.g., Apple® iPad®), wireless watch (e.g., smart watch and/or sports watch), wearable device (e.g., smart glasses), video game devices, wireless electronic patch, wireless device embedded under the skin, a wearable device mounted on a wristband, a wireless device on the user entity's clothing, and any other device capable of wireless communications with network 112. User entity device 104 could be a virtual digital tattoo with some radio frequency (RF) capability. The user entity device 104 also could be a virtual quick response (QR) code that is generated for user entity device 104 at the time of entry and is associated with a moving user entity device 104 and is continually refreshed to allow for tracking the movement of the user entity device 104. The user entity device 104 may be tracked, detected and/or recognized using an ambient intelligence vision system.

As shown in FIG. 3, the user entity device 104, client device 106 and/or smart data hub 108 may include the transceiver equipment of a modern smartphone such as a gyroscope 310 and a global positioning satellite (GPS) 320. The user entity device 104 could also have a cognitive engine 330. Cognitive engine 330 may include a field programmable gate array (FPGA) connected to a biometric, habit sensor, application and sensor hub 340. The cognitive engine 330 may include a series of specialized nano-electromechanical systems (NEMS) 362. The FPGA of the cognitive engine 330 may be programmed with customized biobehavioral compute technology. In an alternative embodiment, instead of an FPGA the functions of the cognitive engine 330 may be implemented in other integrated hardware such as specialized application specific integrated circuits (ASICs). In an alternative embodiment, instead of an FPGA the functions of the cognitive engine 330 may be implemented in software.

As shown in FIG. 3, sensor hub 340 is capable of receiving and analyzing inputs from a plurality of sensors and applications. The sensor hub 340 may include taptics, haptics, fingerprints, location coordinates and elevation, user entity 102 habits and facial, voice and ambient noise, magnetic signature, light, air distinct characteristics like humidity, carbon monoxide, and other recognition sensing capabilities. The sensors in the sensor hub 340 may also include customized NEMS 362. The sensors may be discrete or integrated into the sensor hub 340. The information from the hub 340 is collected and analyzed in cognitive engine 330 to provide a trust score 114 in evaluating the level of verification of the user entity device 104 and whether he or she (or machine entity) is the correct authorizing user entity 102. The sensor hub 340 may include a fingerprint input sensor 341 for a biometric input. The hub 340 may include a wireless detection sensor 342 that may be used to analyze a variety of wireless communication parameters such as a Service Set Identifier (SSID) and their associated attributes such signal strength and proximity to and use in local access networks (LANs) wireless LANs (WLANs), or WiFi access points.

Reference item 344 indicates an analytical engine which is configured to receive input from the other sensors in the sensor hub 340 to monitor the user entity 102 spatiotemporal and behavior patterns and habits to determine if the user entity 102 of the user entity device 104 is the correct entity. For example, habits might include environmental and/or behavioral patterns of the user entity 102 of the user entity device 104 such as the time the user entity 102 wakes up, arrives at the gym, arrives at a secure facility, and/or logs on to the network 112 and the like.

Sensor 346 is used to measure gestures regarding how the user entity 102 handles the user entity device 104 and/or client device 106. For example, these gestures might include how the user entity 102 swipes the screen of the user entity device 104 with their finger including pressure, direction, right handed vs. left handed, and the like. In addition, sensor 346 may measure the electromagnetic signature of the operating environment of the user entity device 104 to determine if it fits a profile for the user entity 102. For example, the subscriber identification module (SIM) card and mobile identification of the user entity device 104 combined with the background electromagnetic factors may all be used in a verification process that the user entity 102 of the user entity device 104 is the correct entity. Reference item 348 measures an internet protocol (IP) address being used by the user entity device 104 and may use a look up feature to verify the user entity device 104 is in a region typically occupied by the user entity 102. Camera 350 may be used for facial recognition of the user entity 102 and other biometric inputs such as a tattoo. In addition, the camera 350 may be used to capture a background of the user entity 102 of the user entity device 104 to determine if it is an environment in which the user entity 102 oftentimes is found (e.g., a picture hanging behind the user entity 102 of the user entity device 104 may conform to a user entity 102 profile). Iris scanner 352 may be used to confirm through an eye scan the identity of the user entity device 104 operator. Reference item 354 indicates the user entity device 104 "unique identification" which may be tied to a SIM card number and all associated unique signatures, an International Mobile Equipment Identification (IMEI) number or an Apple® identification, a telecommunications carrier (e.g., AT&T®, Verizon®), or battery serial number. Ambient noise sensor 356 measures the noise levels surrounding the user entity device 104 including noises from nature and manmade noises (including communication equipment produced radio frequency noise). Ambient sensor 356 may also be able to measure a speaking voice to create a voiceprint to be able to verify that the user entity 102 is authentic. Reference item 358 is an application that measures the "wellness" of the user entity 102 of the user entity device 104 including heart rate, sleep habits, exercise frequency, and the like to gather information on the user entity device 104 and the user entity's 102 lifestyle to contribute to verification decisions. Bus 360 couples the sensors and applications of the hub 340 to the cognitive engine 330.

FIG. 4 shows a more detailed view of the cognitive engine 330 and sensor hub 340. The cognitive engine 330 includes a policy engine 330a, a cognitive risk engine 330b, history tables 330c, and bot detector 330d. (The policy engine 330a corresponds to the user entity device policy engine 104a or the client device policy engine 106a). The policy engine 330a sets the factors in evaluating the risk when receiving input from the sensors and applications on the sensor hub 340. The cognitive risk engine 330b calculates the information received from the sensor hub 340 and makes a determination regarding a trust score 114 in regard to the current user entity 102 of the user entity device 104. The history tables 330c record the user entity's 102 habits of the user entity device 104. The bot detector 330d determines whether a computer program is attempting to trick the user entity device 104 into thinking it is a legitimate user entity 102 by simulating the device owner activities and is attempting to conduct a verification without the actual owner. In one implementation, the bot detector 330d monitors which applications 106c typically operate on the user entity device 104 and if it discovers a new application residing and running beyond the routine, it raises a risk level warning that something unusual is happening with the user entity device 104. Overall, the cognitive engine 330 assists in determination of the type of authentication required based on trust score.

FIG. 5 is a block diagram of system and method 100 showing fewer elements than an overall system diagram shown in FIGS. 1 and 2. As discussed above, system and method 100 includes a user entity device 104 with a user entity browser 105, a client device 106 with a client device browser 107, a smart data hub 108 and a risk engine 110, in an exemplary embodiment. The user entity device 104, client 106, smart data hub 108 and risk engine 110 are communicatively couplable with respect to one another via a network 112 so that the risk engine 110 can monitor the user entity 102, user entity device 104, client device 106 and/or smart data hub 108 to gather behavioral and/or biometric data of a user entity 102 to determine whether they should be allowed access to the network 112. As discussed above, the network 112 may be the Internet or any other suitable public or private data network. The system and method 100 may provide customer and transaction authentication based, at least in part, on biobehavioral verification, as disclosed above.

In the illustrated example shown in FIG. 5, the user entity device 104, client device 106, smart data hub 108 and risk engine 110 each incorporate a policy engine—user entity device policy engine 104a, client device policy engine 106a, smart data hub policy engine 108a and risk engine police engine 110a. The policy engines 104a, 106a, 108a and 110a may establish policy orchestration (i.e., coordination) for the system and method 100 generally which may be established by a system manager. In various examples, the user entity device policy engine 104a, client policy engine 106a, 108a and the risk engine policy engine 110a may operate as a single policy engine for the system and method 100 as a whole. Such a single policy engine may be provided by the risk engine 110 but may receive policy directions from the user entity device 104, client device 106 and/or smart data hub 108. In various examples, the user entity device policy engine 104a (and/or or risk engine policy engine 110a) may establish policy orchestration for policies and protocols concerning how and under what circumstances a user entity 102 may be validated, including circumstances in which a user entity 102 request for admittance to a client device 106, smart data hub 108, network 112 and/or a secure facility may be automatically approved or rejected. In various examples, the risk engine policy engine 110a may establish policy orchestration for policies concerning the circumstances in which an authorizing party (e.g., actual user entity 102) may be required to authorize a transaction of an entity asserting to be the user entity 102. Sensor hubs 340 located in each of the user entity device 104, client device 106 and/or smart data hub 108 allow a variety of environmental/contextual information to be monitored.

In the embodiment of FIG. 5, the risk engine 110 may be operated by or for the benefit of an enterprise which may be any party that may offer a service or control access to a user entity device 104, client device 106, smart data hub 108, network 112 or something for which attempts to engage by a user entity 102 may need to be authorized or authenticated by an authorizing party. The risk engine 110 includes a network interface 116 couplable to the network 112 and a processor 118. The processor 118 may be configured to implement policies provided by the system manager (or authorizing party) to a risk engine policy engine 110a as well as a transaction module 120 configured to complete a transaction (or validation) based on a request as received from the user entity 102. The transaction module 118 may further provide automatic authentication or rejections based on authentication policies. The processor 118 may also be configured to implement an information module and inference engine 122 configured to transmit information to and receive information from the user entity device 104, such as authentication requests and response authentication approvals or rejections. The processor 118 may further be configured to operate an analytics engine 124 that calculates the risk score of each access to the network 112, client device 106 and transactions within post-authorization. The analytics engine 124 operates by analyzing and verifying user entity's 102 identity, inferring contextual data such as user entity device 104 and browser attributes, spatiotemporal velocity, and user entity 102 habits. The analytics engine 124 may be a Core AIML Analytics Engine platform core component. User entity 102 habits may be analyzed by using client device 106 and user entity device sensor hub 340. The analytics engine 124 may be a network allocentric or exocentric anomaly detection engine including data sources from the rest of platform stack such as Security Information Event Management (SIEM), Data Loss Prevention (DLP) or Privileged Access Management (PAM) tools to generate a biobehavioral derived score that is used to maintain the biobehavioral derived credential validity (if it is equal to and/or above the trust score 114). The biobehavioral derived credential validity may be needed to request for authentication in case of loss of confidence, demand for higher level of assurance, or to terminate access by resetting the derived key based on programmed policies of the policy engines 104a, 106a, and/or 110a. In FIG. 5, data from other sources such as internet of thing (IOT) devices that obtain additional ambient intelligence may be fused into the system and method 100. These devices can be ambient third party data sources such as outside camera systems that see the user entity 102 as the user entity 102 travels around during a day in the city. The camera systems may recognize the user entity 102 car, phone or face which are all used to physically verify that the user entity 102 was really there in the location as opposed to user entity 102 digital persona and identifications (IDs) which can be injected into the system 100 electronically and make a synthetic signature of a user entity 102. User entity device 104, client device 106 and smart data hub 108 have an inference engine 104b, 106b, 108b used in verifying the identity of the user entity 102.

FIG. 5 broadly illustrates how individual system 100 elements may be implemented in a relatively separated or relatively more integrated manner. The third party identity provider with risk engine 110 is capable of monitoring user entity 102 device behavior, traffic, and fingerprint analytics. These elements of a risk engine 110 support a method to promote locations, machines, time and classifications of the type of transactions to trusted events based on contextual factors. Such contextual factors may include habits, location, devices, browsers and other factors that can uniquely identify the legitimate user entity 102 using behavioral modeling and context versus threat actors who cannot provide similar behavioral and contextual factors in spite of possession of other binary identity attributes and credentials. The risk engine 110 may establish the normality of events, distinguish significant events that can be classified (normal versus abnormal) and enable calculation of the trust score 114. The trust score 114 may be calculated for each access and/or transaction with the client device 106, smart data hub 108 and/or network 112 and the transactions through the different stages and life cycle of access management including pre-authentication, at authentication and post-authorization to deliver a cognitive continuous authentication system and method 100.

The third party identity provider with risk engine 110 as shown in FIGS. 1 and 5 has the following plurality of platform core capabilities. One, obfuscation to harden against commonality analysis and detection by fraudsters. Two, classification through common fields versus distinguishable fields. Three, at least one application programming interface (API) 111a to send and receive encrypted data from third party providers. Four, significant analytics and inference capabilities to feed to the risk engine 110 (e.g., LOA engine) including determination of font, the device operating system (OS) version, central processing unit (CPU) model, canvas, native fingerprinting plugins, and proxy. The risk engine 110 further has communication and connectivity capabilities, service delivery and application programming interface (API) mechanisms to aggregate data from relying party applications. In addition, various third party databases, secure information and event management (SIEM) providers, User Behavior Analytics (UBA) tools, calculation of threat intelligence, bot detection and other cyber security tools used by enterprise can be integrated via a smart data hub and fed to the AIML powered risk engine 110. As shown in FIG. 5, at the core of the risk engine 110 may be an artificial intelligence/machine learning analytics engine 124 that processes and analyzes the various data sources including data from a third party risk API, risk engine information module and inference engine 122 which is capable of detecting network 112 anomalies and user entity inference engine 104b (e.g., user entity biobehavioral engine). Analytics engine 124 is capable of measuring parameters that identify different classes of network attacks and anomalies at the time of any given set of transaction as both allocentric parameters of the traffic feeding into the inference engine 122 as well as user entity 102 behavior fingerprints. At the network level, this inference is achieved for attacks such as Transmission Control Protocol (TCP) synchronize (SYN), Internet Control Message Protocol (ICMP) and user entity 102 datagram protocol (UDP) flooding, and portscanning as examples of classes. These classes are measured by metering the number of flows with similar patterned payloads to the same destination socket, measuring total volume of flows in bytes and the average packets in flows and hence allowing to establish a distinct behavior by plotting a pattern of normal traffic. Other allocentric parameters of interest may include number of flows that have a similar volume, same source and destination address, but to various different ports. At the user entity 102 behavior level this inference establishes normality of a user entity 102 behavior such as their trusted location and user entity 102 spatiotemporal velocity. Also, in other examples, location and proximity inferences of user entity devices 104 is calculated versus their client device 106 and/or smart data hub 108 initiated transactions. This may be compared with the last event of interest including an authentication event or other significant events such as major Internet Protocol (IP) change, policy change, or ambient gross violation such as location-time violation that are provisioned by artificial intelligence and machine learning (AIML) configurable policy engine and fingerprinted by a user entity device 104 browser traffic device (UBTD) search & match engine.

Referring to FIG. 5, the trust level of the data collected by the risk engine 110 is a derived trust score 114 (or confidence score) that depends on an anti-tampering rule engine 125 and the mobile application risk engine 110 which is all fed into the business application analytics engine 124. Analytics engine 124 calculates the risk versus friction and triggers an Audit & Early Warning Engine 126 to initiate an appropriate out of band transactions to inform a good user entity 102 of the intent via an Out Of Band (OOB) API. OOB API may use a mobile app, mobile device, and other methods of notification to receive a push notification or other methods of authentication such as OTP SMS/email/call or Timebased One Time Passwords (TOTP).

Data stored in a data base in the system 100 may contain personal identifier information (PII) and sensitive private information that needs anonymization. These are tokenized and hashed in transit and also at rest via an anonymization token engine that anonymizes the PIIs as a function of relying party privacy rules, guidelines and regional laws all via risk engine policy engine 110a (which may be an AIML configurable policy engine). Third party data about the user entity 102, user entity device 104, client device 106 and transactions are made available via third party data APIs enabling a cross company-industry data fusion which can provide black lists or white lists again via the risk engine policy engine 110a.

In FIG. 5, the user entity 102 behavior and journeys are tracked so that pre-authentication intelligence allows the risk engine 110 to predict and classify the user entity 102 and determined whether the user entity 102 is a threat actor (e.g., a bot, suspect device, and/or suspect browser) or a good user entity 102. The data collection on user entity 102 behavior, user entity device 104, client device 106, smart data hub 108 and relying party 113 and transaction risk is collected and results in a context aware risk based authentication which can balance risk versus friction for class of a good user entity 102 versus additional friction for threat actors including denial of service or a step up authentication for suspect, new, and/or high risk transactions. It is significant that post-authorization in FIG. 5 the user entity 102 and their transactions may be continuously monitored and a dynamic level of assurance and even a denial of service is injected when the trust score 114 is calculated. An aggregate of the risk engine 110 and third party data provided by other analytics and risk engine platforms such as SIEM solutions as illustrated delivering the cognitive continuous authentication that may minimize risks even post-authorization by detecting anomalies through the life cycle of a transaction and provide a novel technique to detect abnormal behavior and report to IT and user entity 102 of the services protected by risk engine 110.

Examples of data captured by the risk engine 110 such as behavior patterns and attributes of the user entity 102 may include the following. First, user entity device 104 and browser 105 and client device 106 and browser 107 have fingerprints that uniquely identify a user entity device 104, client device 106, user entity browser 105, client device browser 107, a network 112, habits of user entity 102 on the user entity device 104 and/or client device 106 which are all used for accessing compute and data and services. User entity device 104 and client device 106 have footprints that may include browser attributes such as screen size, screen resolution, font, language, and browser version. Second, central processing unit (CPU) and operating system changes may not be okay but browser (105, 107) upgrade may be okay. Third, user entity 102 behavior and habits and inference of the user entity 102 normal behavior may be used to identify risks associated with transactions. Fourth, trusted devices are devices that have been repeatedly authenticated over a period of time. The number of top trusted devices may be limited to a predetermined number (e.g., 5). Fifth, a risk based authentication system that uses mobile device or other modalities of verification such as email, short message service (sms), voice, push, and voice call to promote locations, machines and time and type of transactions to trusted events/habits of user entity devices 104. The system and method 100 allows for calculating individual transaction risk based on contextual factors such as user entity 102 behavior, user entity device 104, user entity device browser 105 and the network traffic and request for authentication by account owner when risk greater than allowed threshold. Sixth, a client device 106 (e.g., a PC desktop) that has not been used for a long period of time (e.g., days or weeks) will be dropped from a trusted device list. Seventh, location which may be found by Internet Protocol (IP) reverse lookup of Internet Service Provider (ISP). Eighth, user entity behavioral footprint on desktop PC (client device 106) such as speed of user entity typing, number of hours and time intervals user entity is on this device (e.g., iMac® at home is usually used in evenings and weekends; use of touch screen feature). Ninth, user entity 102 behavior footprint might also include: time of use, location of use; hardware (including auxiliary devices such as type of keyboards, mouse, and user entity behavior on both); browser specific data such as browser updates and changes (i.e., heuristics), browser type, browser version, plug-in and applications; brand and type of CPU, operating system; browser user entity configuration such as fonts (e.g., expected fonts versus user entity configured fonts), language and the like; Canvas financial planning, type of display, screen resolution; and/or time zone, internet protocol (IP) address, geographic location. Tenth, code in the browser (e.g., JavaScript code)

and/or installed on the device (104, 106) executing on the computer collects data from the desktop 106 may be used. Eleventh, with regard to the user entity device 104 footprint it may include subscriber identity module (SIM), international mobile equipment identity (IMEI), applications on the device, and/or secret keys. Twelfth, with regard to the user entity device 104 it be derived behavior footprint such as location, habits, walking gait, exercise, how any times you call your top contacts (e.g., top 5 contacts). Thirteenth, the sequence of events and derived context of normal versus abnormal may also be considered.

Figure 6:
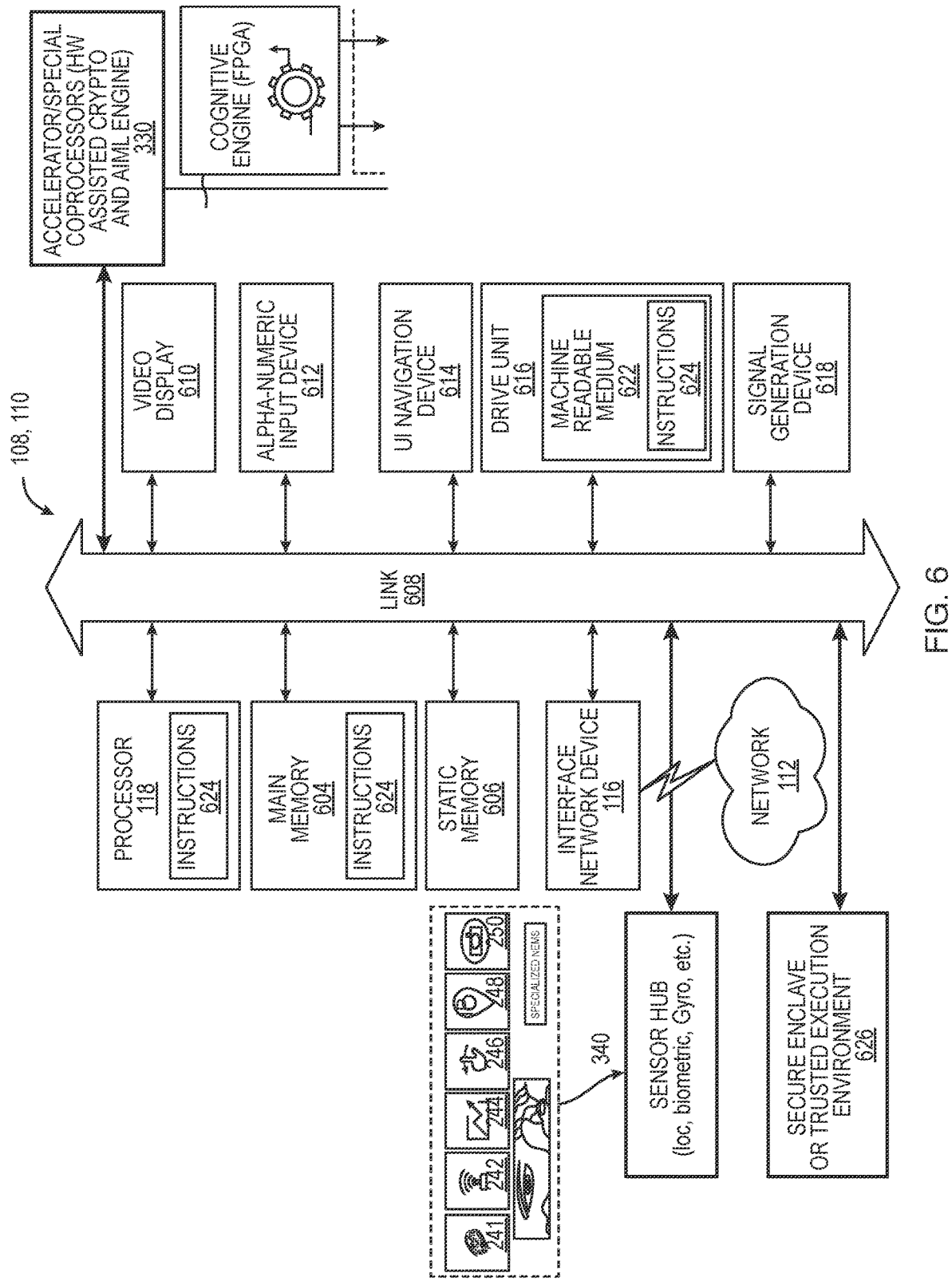
FIG. 6 illustrates a schematic view of the details of the smart data hub 108 and risk engine 110 which may have Core Artificial Intelligence and Machine Learning (AIML) analytics engines.

FIG. 6 is a block diagram illustrating in a more detailed manner the components of smart hub 108 and third risk engine 110, according to some example embodiments, able to read instructions from a machine-readable medium (e.g., a machine-readable storage medium) and perform any one or more of the methodologies discussed herein. Smart data hub 108 and risk engine 110 may be controlled by the system manager (or policy manager) of the network 112, client device 106, relying party 113 and/or secure facility or it may be controlled an independent party providing a security service to the user entity device 104, client device 106, relying party 113 and/or network 112. Specifically, FIG. 6 shows a diagrammatic representation of the smart data hub 108 and/or risk engine 110 in the example form of a computer system and within which instructions 624 (e.g., software) for causing the risk engine 110 to perform any one or more of the methodologies discussed herein may be executed. In alternative embodiments, the smart data hub 108 and risk engine 110 operate as standalone devices or may be connected (e.g., networked) to other machines. In a networked deployment, the smart data hub 108 and/or risk engine 110 may operate in the capacity of a server machine or a client machine in a server-client network environment, or as a peer machine in a peer-to-peer (or distributed) network environment. The smart data hub 108 and/or risk engine 110 may be a server computer, a client computer, a user entity computer (PC), a tablet computer, a laptop computer, a netbook, a set-top box (STB), a user entity digital assistant (PDA), a cellular telephone, a smartphone, a web appliance, a network router, a network switch, a network bridge, or any machine capable of executing the instructions 624, sequentially or otherwise, that specify actions to be taken by that server. Further, while only a single risk engine 104 is illustrated, the term "server" shall also be taken to include a collection of servers that individually or jointly execute the instructions 624 to perform any one or more of the methodologies discussed herein.

The smart data hub 108 and/or third party identity provider with risk engine 110 includes the processor 118 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The smart data hub 108 and/or risk engine 110 may further include a graphics display 610 (e.g., a plasma display panel (PDP), a light emitting diode (LED) display, a liquid crystal display (LCD), a projector, or a cathode ray tube (CRT)). The smart data hub 108 and/or risk engine 110 may also include an alphanumeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a speaker), and the network interface device 116.

The storage unit 616 includes a machine-readable medium 622 on which is stored the instructions 624 (e.g., software) embodying any one or more of the methodologies or functions for operation of the system and method 100 described herein. The instructions 624 may also reside, completely or at least partially, within the main memory 604, within the processor 118 (e.g., within the processor's cache memory), or both, during execution thereof by the smart data hub 108 and/or risk engine 110. Accordingly, the main memory 604 and the processor 118 may be considered as machine-readable media. The instructions 624 may be transmitted or received over network 112 via the network interface device 116.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a server (e.g., server), such that the instructions, when executed by one or more processors of the machine (e.g., processor 118), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Substantial variations may be made in accordance with specific requirements to the embodiments disclosed. For example, customized hardware might also be used, and/or particular elements might be implemented in hardware, software (including portable software, such as applets, etc.), or both. For example, as shown in FIG. 6, cognitive engine 330 may be accelerator/special coprocessors (e.g., hardware assisted crypto and AIML engine). FIG. 6 also shows a Trusted Execution Environment (or secure enclave) 626 with an engine that allows the application layer to store keys and execute code in a way that the operating system and other application systems cannot access FIG. 6 further shows that in alternative embodiments, the computing device can represent some or all of the components of the risk engine 110. The computing devices alternatively could function in a fully virtualized environment. A virtual machine is where all hardware is virtual and operation is run over a virtual processor. The benefits of computer virtualization have been recognized as greatly increasing the computational efficiency and flexibility of a computing hardware platform. For example, computer virtualization allows multiple virtual computing machines to run on a common computing hardware platform. Similar to a physical computing hardware platform, virtual computing machines include storage media, such as virtual hard disks, virtual processors, and other system components associated with a computing environment. For example, a virtual hard disk can store the operating system, data, and application files for a virtual machine. Virtualized computer system includes computing device or physical hardware platform, virtualization software running on hardware platform, and one or more virtual machines running on hardware platform by way of virtualization software. Virtualization software is therefore logically interposed between the physical hardware of hardware platform and guest system software running "in" virtual machine. Memory of the hardware platform may store virtualization software and guest system software running in virtual machine. Virtualization software performs system resource management and virtual machine emulation. Virtual machine emulation may be performed by a virtual machine monitor (VMM) component. In typical implementations, each virtual machine (only one shown) has a corresponding VMM instance. Depending on implementation, virtualization software may be unhosted or hosted. Unhosted virtualization software generally relies on a specialized virtualization kernel for managing system resources, whereas hosted virtualization software relies on a commodity operating system—the "host operating system"—such as Windows or Linux to manage system resources. In a hosted virtualization system, the host operating system may be considered as part of virtualization software.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Returning to FIGS. 1 and 2, the system and method 100 described herein provides smart multifactor authentication via security assertion markup language version 2 (SAML 2.0) and/or open id connection authentication (OIDC) which provides a user entity experience where the context of the login request is evaluated and the user entity 102 is either immediately prompted to choose a multifactor authenticator, or based on policy, context, and behavior of the request is either automatically approved or rejected by risk engine 110. Post-authorization may be obtained as the behavior and the risk posture of the user entity 102, application 106c, network 112, data, browser (105, 107) or device changes (inferred by a risk engine 110 ingesting various enterprise data) and a step-up authentication is injected in accordance with policy.

FIG. 2 details operation of the smart data hub 108 shown in FIG. 1. The smart data hub 108 ingest logs and since application (or services) 106c and user entities 102 all have identifications, time stamps and context then third party tools such as security information and event management (SIEM) and data loss prevention (DLP) will be inferred to identify anomalies for a given user session and application (or service) 106c. The data feed from external systems (SIEM logs, APIs, DNS Security logs, and content delivery network (CDN) logs) flows through a data ingestion component into a storage system which is cleaned and integrated with other data streams. The data integration component cleans and integrates data streams from several sources and unify the data format with an internal data format. The internal data stream flows into the inference component of the analytical models (e.g., artificial intelligence) and back to the storage system, along with the label acquired from inference, for later training and correction of the analytical model. The analytical model management includes an online (incremental) training of some AI models and batch training. Though the incremental training allows the latest data to contribute to the inference decision, it decreases model accuracy over time; thus the accuracy may be readjusted with a batch training every twenty four hours.

Given that authentication is not a single event with a binary yes or no, but it is rather a continuum. Smart data hub 108 provides a precise way to detect and recognize application 104c and 106c security posture using a continuous security check over time on user entities 102, applications (104c, 106c) and their behavioral change through the life of a session. It is a system configuration and architecture with streaming in the core that efficiently collects data from several sources of relying party 113 tool sets and security and network application, orders and makes sense of the data, and finally stores the data for later reference when an intrusion takes place for commonality analysis. Processing in the smart data hub 108 may be batch processing and/or stream processing. Batch processing is defined as a scheduled transmission of a limited set of records. When the number of records in a batch is infinite, then the batch data is dubbed a data stream. Thus, data batch is a special case of data stream, where the number of records is finite, while data stream is an infinite set of records received from one or more sources, such as sensors or web server access logs. In data stream processing, the data keeps coming from the sources over time. To process a data stream, the developers define a window of time (or other types of windows) on the stream, which leads to buffering a small batch of data for every window of time passes. Then, the developers run batch algorithms on that generated batches sequentially until the end of the stream. Batch and stream are two faces for the same currency with performance and accuracy differences: in stream processing, the data is processed as it becomes available; therefore, the stream processing response to the data changes is faster than the batch processing. With stream processing, it does not require the data to be stored in a batch of 24 hours in order to do traditional batch processing. Stream windows can overlap and have complex forms that are hard to orchestrate and schedule in traditional batch processing systems.

Authentication and authorization are widespread traditional terms in systems security. Authentication is to verify that the user/client/customer is "whom the user says he is." Authorization is the action to give the user entity 102 permissions to access specific resources in the relying party 113 system. Behavioral verification is the continuously verified authentication over time after every user entity 102 action. The user entity 102 actions can be the user entity's calls to a set of services in the relying party 113 system. In a microservice architecture, every functionality in the system is modeled with a microservice. Web servers host the microservices and records logs for every call to the services 106c. The aforementioned behavior makes microservices architecture a significant contributor to behavioral verification.

Traditional systems use authentication as the first line of defense. Once the user entity 102 enters the relying party 113 system, he is trusted, and only the authorization is what plays a role in limiting the user entity 102 activities in the system. The authentication role ends here, and the system developers, most of the time, find themselves keeping the web server access log files and other logs for a short time before deleting them. This is not the case for the continuous behavioral verification. The input for the behavioral verification is the access logs and other logs in the system. The behavioral verification used by risk engine 110 does not only authenticate the user entity 102 on the login, but continues to verify the user entity 102 over time while the user entity 102 performs his activities in the system. A feature of the smart data hub 108 is to have a recovery mechanism for after authentication detected imposters. Once the risk engine 110 detects a change of behavior of an imposter because of their not expected behavior, the risk engine 110 trackbacks the changes that the imposter has performed to the relying party 113 system, or at least marks the services that the imposter infected. This feature may be referred to as the "time machine".

The smart data hub 108 architecture consists of at least three main components running on the data streams: i) a data ingestion component; ii) data integration, management (i.e. time machine), and storage; and iii) the AIML models training, management and inference. Data feed from external systems (SIEM logs and APIs, DNS Security logs, CDN logs and APIs) and other data flow through the data ingestion component into a storage system where it is cleaned and integrated with other data streams. The data integration component cleans and integrates data streams from several sources and unify the data format with the risk engine 110 internal data format. The internal data stream flows into the inference component of the AI models and back to the storage system, along with the label acquired from inference, for later training and correction of the AI model. The AI model management includes an online (incremental) training of some AI models and batch training. Though the incremental training allows the latest data to contribute to the inference decision, it decreases model accuracy over time; thus, the accuracy is readjusted with a batch training periodically (e.g., every twenty four hours).

The benefits of the smart data hub 108 and the third party identity provider with risk engine 110 include the following. The risk engine 110 uses smart data hub 108 and AIML models to detect anomalies and enforce behavioral verification to detect imposters who might have stolen the user entity 102 credentials to access the relying party 113 system or change the security posture. The digital behavioral modeling of users, class of actor (threat actors vs legitimate) and path to classification, anomaly detection and commonality analysis combined with data stream enables continuous calculation of trust score 114 using AI models which perform predictions on the data streams. This makes possible detection in real-time (or approximately real-time). This is a benefit over traditional systems since it is configured to perform an incremental update of the AI models over a defined stream window and the mining of the data which determines if the compromise might be in effect with key advantages and capabilities.

As discussed above, the system and method 100 uses behavioral authentication to allow for an infrastructure for highly secured frictionless (including passwordless) systems and transparency of the user entity 102 activities in the relying party 113 system which are directly monitored by the relying party 113 system (including the primary IDP 109), the relying party and primary IDP 109 data analysts, and the relying party 113 and primary IDP information security and information technologists. The system and method 100 allows for high speed in interception of intruders and suspicious behavior and for marking all the infected services by the intruders throughout the session as well as commonality analysis by the relying party 113, primary IDP 109 and risk engine 110.

Online transactions may include simple logins, financial transactions, data mining, and/or workflows. Identity proofing of the user entity 102 (human or non-human) requires the user entity 102 to identify themselves on-premises or remotely and reliably with a certain required degree of certainty. The system 100 uses to criteria with regard to risk. The first is the desired level of assurance (LOA) of each associated transaction or session and the second is the decay level in the system.

Level of assurance (LOA) is a dynamic concept in the system 100 whether at login or within an active session. The LOA may continually vary depending on what the user entity 102 is attempting to do in system 100. The level of assurance may require a real time response as a function of the associated LOA required for each transaction or each level of access within the active session. For example, a login session for an online banking service (a typical example of a relying party) may require not only a credential-based trust model (e.g., simple user entity 102 name and password) for general login and looking at balance history but may need a dynamic transactional-based model where additional factor(s) are required to transact a transfer or payment. Upon the initiation of a transaction with a higher LOA for the session login, the system and method 100 may ask the user entity 102 for additional verification to authorize the transaction. Upon completion of a transaction the session credential will resume to a baseline credential based at the lower LOA till the next transaction and associated LOA is presented or perhaps the session is terminated per policies orchestrated (e.g., time of inactivity). In this description, "time to live" is the pre-determined time that the attributes or verified credentials are valid for. Periodically, a risk engine 110 of system 100 will perform a "refresh" to update at least some of the plurality of verified attributes and the verified credentials of the user entity 102 based on predetermined policies established at the risk engine policy engine 110a and on demand from the risk engine 110. In the online banking example, to authorize the login and access to account balance versus a transaction, such as an online payment, the system and method 100 disclosed herein may require different LOAs with different types of multifactor authentication and out of band identity proofing such as using a combination of contextual information such as location, biometrics and digital fingerprint of a binded user entity device 104. In addition, there could be cross-application level of assurance wherein each different application may have a different predetermined level of assurance. For example, a poker game application which requires the exchange of money may require a higher level of assurance than a social media application (e.g., Facebook).

The user entity 102 contextual factors and network contextual factors may further include at least one or more of the following egocentric or allocentric factors: mobile device model, mobile device hardware configuration, mobile device operating system, mobile device applications, mobile device web browser version, service set identifier (SSID) of the network WiFi, network information such as IP address, object classes transferred, screen size, font size, language, user entity habits including speed and style of user keyboard entry, mouse strokes, screen touch, adjacent companion mobile device in proximity, biobehavioral data derived from the user entity such as walking gait, trusted locations of the user, haptic-tactic factors derived from hardware sensors embedded inside the device, various specialized sensor data captured by the hardware such as ambient noise, temperature, discrete movement and location of the mobile device, walking and exercise habits of owner, user entity location and user entity driving, transactions on mobile including services, applications used and their frequency and duration including calls, browsing, use of various applications, and exercise routines.

Figure 7:
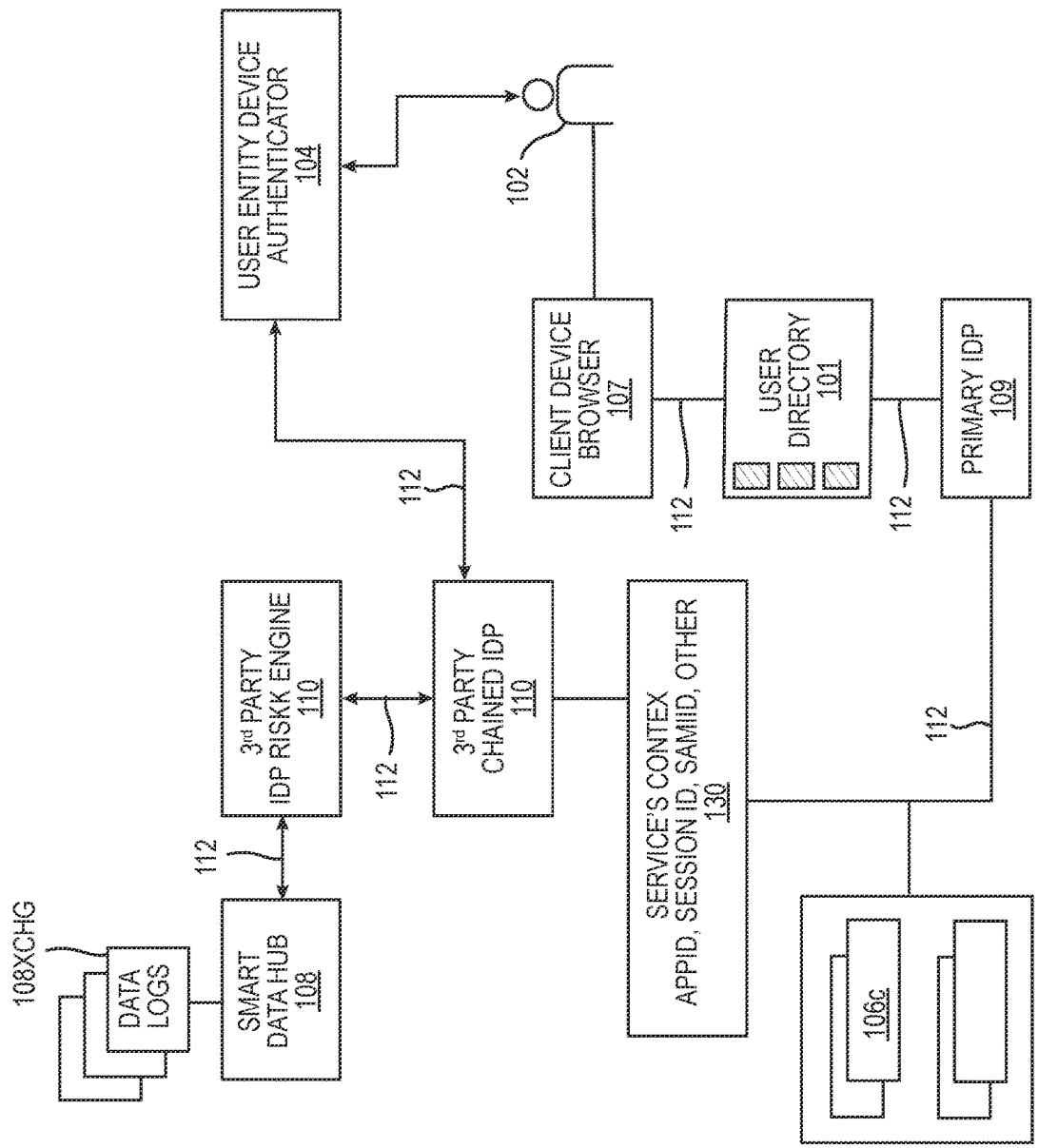
FIG. 7 is a simplified, higher level view of the system and method 100 of FIG. 1.

FIG. 7 is a simplified, higher level view of FIG. 1. In a single sign on (SSO), the primary identity provider (IDP) 109 creates a front door for a number of service providers such as Gmail, Office365, Github, and Zoom to allow a user entity 102 to use a one time login authentication to access their services (or applications) 106c. Every post-authorization access then become children of that login. The primary IDP 109 may pass user entity 102 identification and context of service 106c to the third party identity provider with risk engine 110 which can analyze and either take action or instruct the primary IDP 109 to take action regarding abnormal activity by the user entity 102. The third party identity provider with risk engine 110 becomes the proxy for user entities 102 to login and have access to a number of service providers/applications 106c without having to enter the user entity 102 credentials (such as usernames and passwords) at every access to a service 106c. The risk engine 110 may utilize the policy engine 110a to allow automatic approval if the user entity device 104 is at the same location as the client device 106 upon which the user entity 102 is working. In this instance, even a multi-factor authentication might not be required depending on the level of assurance (LOA) of the application 106c upon which the user entity 102 is working. Applications 106c are service providers such as McAfee, Office365, Gmail, and a dashboard or administrative panel for security. There may be potentially hundreds of these applications 106c. Rather than having multiple passwords, there is single sign on (SSO). A problem with having a central door is that a bad actor who has the password may gain access to the services 106c and have the key to the kingdom. Risk engine 110 may broker entry for the user entity 102 to each of these plurality of applications 106c. Some of these applications 106c need to have a higher privilege (or higher level of assurance). Therefore, the risk engine 110 may need to step up and do additional identification. For example, risk engine 110 may use multifactor authentication. A problem is that authentication is not a single event. After a user entity 102 enters an application 106c, the user entity 102 may become a victim of phishing or takeover of the session or the like. Therefore there is a need for continuous authentication to address these abnormalities. Each of these applications 106c have different type of normal behavior (and correspondingly abnormal behavior). If abnormality detected, there is a need to report to the risk engine 110. The risk engine 110 then needs to notify the primary identity provider 109 to usher the online intruder out of the application 106c. Therefore, post-authorization—after authenticated and authorized entry to an application 106c, risk engine 110 will monitor based on context and past behavior to determine anomalies. There is a need to identify which bad actor and which service 106c to usher the bad actor out of. When the service 106c is selected, the primary identity provider 109 will provider user entity 102, application 106c, contextual information and behavioral information to the risk engine 110 and the detection of an anomaly will either kill the user entity 102 session or step up authentication. The goal is to avoid MFA fatigue rather than every time a user entity 102 clicks on a service 106c they have to do an MFA.

Primary identity provider 109 plays the role of front door service provider and SSO owner. The primary identity provider 109 tracks and collects contextual and behavioral information of the user entity 102 and discrete selection of targeted services and applications 106c. The primary identity provider 109 may delegate login including risk based MFA to a third party identity provider with risk engine 110 which can take an intelligent action such as terminate a user entity 102 session, require a step up with new MFA, allow the session to continue and automatically approve. The primary identity provider 109 hires the third party identity provider 110 which may be referred to as a "chained identity provider" because it is tied to the primary identity provider 109. The applications 106c are tied to primary identity provider 109 and the primary identity provider 109 owns the relationship with all the services 106c. Instead of killing all services 106c when an anomaly is detected, it is preferable to only kill that particularized service 106c. Not all user entities 102 are banned, but rather only one of the user entities 102 is banned. Even better, is that it allows for the ending of only the session with a particular service 106c rather than locking a user entity 102 out of all services. The decision on which session with a service 106c to be ended may depend on the application 106c plus the user entity 102, the context such as client device 106 and the associated browser plus the session identification. The particularity of the session and service 106c end is important so as not to lose productivity from a legitimate user entity 102. Risk engine 110 tracks and collects contextual information and discrete selection of the targeted services 106c.

The delegation of login may also be made to the primary IDP 109 which may include risk based MFA and the sending of this information the third party identity provider 110. The primary identity provider 109 may then send contextual and behavioral information of the user entity 102 such as application 106c identifier (e.g., service 1) to third party identity provider with risk engine 110. The risk engine 110 detects abnormality and determines which one it needs to kill. During this flow from Primary IDP 109 to risk engine 110, the user entity 102 identification (UserID), application identification (AppID) and session identification (SessionID) is passed and other attributes in the subject element of the SAML authentication request (AuthnRequest). These attributes are used to determine which user entity 102 needs to approve the multi-factor authentication request and needed information about the application 106c that the user entity 102 is trying to request or whether not the request is coming from the same session, providing the granularity of risk calculated from the third party user behavior analytics (UBAs) and risk engines 110 that can feed into the risk calculation at authentication and most importantly post-authorization by correlating the session ID and AppID to set of policy orchestrated risk factors. Additionally, if a user entity 102 rejects an MFA request (or times out or an error occurs), the risk engine 110 now has a mechanism to take action or inform the primary IDP 109 of this and either the risk engine 110 or the primary IDP 109 to take appropriate actions at authentication or post-authorization.

During the MFA flow, the application 106c or 104c with the discrete application identification (APPID) and the associated SessionID and SAML identification (SAMLID) allows the third party identity provider with risk engine 110 to map the context 130 and AppID, SessionID, SAML identification for the specific service/application (104c and 106c) and using the LOA score risk engine. This may trigger a step-up authentication request (i.e., an authentication request) to user entity device 104 for the target AppID.

The AppID could be included within an element of SAML authentication request when passed up to the Primary IDP 109. For example, the SAML 2.0 specification offers a number of extension points, such as the arbitrary elements extension point of the subject confirmation data element, and this case the SAML authentication request. In one permutation adding the application ID to a passthrough parameter will allow automatic approval of the authentication request where in other cases it may eliminate the application session or the full SAML session managed by primary IDP 109 for all applications 104c or 106c associated with user entity 102. The passthrough parameter passed with the SAML authentication request can contain the unique identification of the requesting application 106c. In another permutation the application identification as an additional parameter can work. The application identification may also be passed as a named parameter. For example: maintaining a session identification to enable dynamic risk score post-authorization. The session identification is unique value that would persist during a user entity 102 current authenticated session that is used to add context to the MFA request and is included in the same way as the application identification described above. This is the same mechanism proposed above to pass the application identification. Adding the session identification to the SAML Request may be needed and as suggested above with an application identification. The adding of the session identification to a passthrough parameter enables the application identification for the session identification which is passed with the passthrough parameters. Adding the session identification as an additional discrete parameter is also possible. A method to handle a rejected MFA through the policy and risk engine 110 is to reply with an empty SAML request parameter and redirect a user entity 102 to a third party identity provider 110 page. The user entity 102 could also be redirected to a specific third party identity provider 110 URL. This could potentially accept an error message parameter that could be displayed on the response page and include a link back to the SSO application portal.

To summarize, device identification of client device 106 and context of applications services 104c and 106c such as AppID, SessionID, and SamIID are passed to third party identity provider with risk engine 110 which can direct primary IDP 109 to take actions if on premises services and cloud services 106c (or 104c) are detected to have abnormal behavior at-authentication or post-authorization, or if the client device 106 security posture has changed or context of authenticator user device 104 and therefore the user 102 posture has changed which is to prompt change in level of assurance that is calculated by risk engine 110. Risk engine 110 uses data from data hub 108 and sources of relying party 113 data logs 108xchg.

The third party identity provider with risk engine 110 in charge of intelligent MFA, during pre-authentication calculation, at-authentication, and post-authorization by calculating the risk continuously receives contextual data from primary IDP's 109 so it can track individual or class of applications and services risk score through life cycle of the SAML session. The application and services 104c or 106c context and risk score calculated by the risk engine of third party identity provider with risk engine 110 through a set of policies once evaluated can trigger a step-up authentication and the user entity 102 is either immediately prompted to choose a multifactor authenticator, or based on policy, context, and behavior of the request is either auto-approved or rejected. Post-authorization as the behavior and the risk posture of the user entity, application 104c or 106C, network 112, data, browser or devices 107 changes (inferred by the third party identity provider with risk engine 110 ingesting various enterprise data), a step-up authentication is injected per policy. During such flow the username for user entity 102 is passed by primary IDP 109 as the subject NameID attribute in the subject element of the SAML authentication request as shown in the following:

<saml2:Subject xmlns:saml2="urn:oasis:names:tc:SAML:2.0:assertion"><saml2: NameID>user@example.com</saml2:NameID>
</saml2:Subject>

This value determines which user needs to approve the multi-factor authentication request. During this flow, the information about the application 106c that the user entity 102 is trying to request or whether not the request is coming from the same session is provided. This enables the ability of a client getting to the granularity of risk calculated from the third party user behavior analytics and risk analyzers of the risk engine 110. Additionally, when a user rejects an MFA request (or times out or an error occurs), there is a discrete mechanism to inform the primary IDP 109 of this rejection and letting the primary IDP 109 take appropriate action. In this case the third party identity provider with risk engine 110IDP sends a SAML response allowing a display of a reject/error to the primary IDP 109 domain when an MFA is rejected. In other cases, the third party identity provider with risk engine 110 may be responsible to display the error/rejection and allow user to re-try if desired. The Primary IDP 109 provides a list of relying party 113 applications 106c and 104c to the third party identity provider with risk engine 110 through an out of band or third party identity provider with risk engine API 111a call where the application identification is sent during the MFA flow that would match the application identification returned from the primary IDP 109.

In one permutation the application identification is included within an element of SAML authentication request. For example, the SAML specification offers a number of extension points, such as the arbitrary elements extension point of the <SubjectConfirmationData> element, and in this case the SAML AuthnRequest may have an element like:

<saml2:Subject xmlns:saml2="urn:oasis:names:tc:SAML:2.0:assertion">
<saml2:NameID>user@example.com</saml2:NameID>
<saml2:SubjectConfirmationData>
<AppID>12345</AppID>
</saml2:SubjectConfirmationData>
</saml2:Subject>

In other permutations the applications 104c and 106c identifications could also be passed as a named parameter. For example:
https://{domain}/SAML2/SSO/Redirect?SAMLRequest=reque- st&RelayState=token&AppId=encrypted (12345)
In this case note that the application identification is signed by the primary IDP 109 to guarantee security and integrity of contextual data exchange. In other alternatives application identification can be accompanied with additional contextual information such as a session identification, device and browser context which would be a set of unique values that would persist during a user entity's 102 current authenticated session of the primary IDP 109. These values are used to add context to the MFA request and should be included in the same way as the application ID described above. SAML protocol above can be replaced with other protocols such as Open ID Connect and others.

Humans constantly assess their environment and base their decisions on their observations and prior experience. In contrast, most existing security solutions neglect contextual information and are static in nature, never adapting to new situations and challenges. Note that context without element of time is yet another binary indicator. Hence throughout this disclosure the importance of context and behavior which is derived from context but has an element of frequency and time order the time machine discussed above. By constantly observing and analyzing the user entity 102 routines, the process of biobehavioral modelling of risk engine 110 creates discrete models that allow for the prediction of the next actions of the user entities 102 and the ability to detect and distinguish legitimized, suspicious, or sub-optimal and even dangerous behavior. This modelling process applies state-of-the-art technologies from artificial intelligence and machine learning and affects many levels of the user entities daily life. From abstract concepts such as commute and exercise activity, or browser behavior and computing devices to more subtle patterns like the unique characteristics of a user entity's walking gait and other biometrics. This unique combination of factors unambiguously characterizes the user entity 102 and allows the decision-making risk engine 110 to rate behavior. Consequently, the risk engine 110 computes a dynamic level of assurance that takes the maximum of contextual information into account. Similar to the dynamic nature of a human life, the risk engine 110 using biobehavior continually observes and adapts to changes and "grows" together with the user entity 102 and is part of cognitive continuous Authentication®.

The following section will provide an overview of behavioral authentication and the requirements that arise to a cognitive continuous authentication system within the use of risk engine 110 combined with smart data hub 108 architecture. The user entity 102 daily behavior may be monitored via mobile and ambient data. In a typical use case for biobehavior analysis, a user entity 102 tries to access either a remote or local resource of the relying party system 113 that requires authentication. While user entity 104 or client device 106 fingerprinting (for remote) and biometrics (for local access) can be used for authentication, both are vulnerable to replay attacks. Multifactor authentication (MFA) that requires an additional out-of-band device (e.g., a confirmation on user entity device 104) significantly increases security. However, it is insufficient as a loss of the device and the increase in friction is significant.

The biobehavior approach of the risk engine 110 also relies on an out-of-band devices such as a mobile phone or wearable devices but offers three important advantages. First, an authentication factor so that the relying party 113 system benefits from the rich sensors in modern mobile devices. Based on that, the employed artificial intelligence uses machine learning (AIML) to create models that can recognize regular and abnormal behavior, detect anomalies in the ambient sensor data (i.e., missing background noise when being in a public space or an unusual walking gait) and, in general, verify whether it is still in the possession of its owner. As such it is an essential part of the authentication process. It provides additional, reliable contextual and behavioral information such as the owner's verified location and current activity and past digital behaviors and habit. For instance, a banking transaction may be unlikely if the user is currently outdoors exercising and even more so the transaction is requested from a desktop computer. On the other hand, the risk engine 110 is adaptive and behavior considered unusual by a majority can be perfectly normal for an individual's unique biobehavior model. Eventually, the models contribute to the overall level of assurance in an access that grants reduced friction to the end user. Second, biobehavior is the determining authentication. The relying party 113, primary IDP 109 and risk engine 110 all play a more active role in the authentication process working together. Access from a verified relying party 113 system can be allowed with minimal friction. Then, the biobehavior becomes determining authentication factor. A loss of a client device 106 or user entity device 104, on the other hand, can quickly be detected and reacted upon actively: User entity 102 accounts are blocked, data is removed (or encrypted) and using the device as an access token will be prohibited. Third, in the prediction of user entity 102 behavior machine learning models may capture an abstract representation of user entity 102 routines and unique characteristics on varying time scales. The variants applied in the biobehavior system of system and method 100 are capable of predicting future behavior, activities and locations. As such it is possible to preemptively act on conditions (like suggesting to avoid traffic), prepare a resource ahead of time, or interact with a smart home in a more secure way than geofencing. These collectively enable example application among others such as all flavors of access of online applications and services, data assets, resources such as banking, online shopping or remote logins, securing mobile payment and physical access control systems (PACS). Note that derived solutions of the same base behavioral modeling system can be used for applications other than authentication including both anomaly detection as well as corrective behavior system using mobile and ambient sensors. Applications may include patient care, physical safety, contact tracing, hygiene workflows, mental health and assistance feedback system.

The system and method 100 may use attributes of user entity 102 and associated trusted devices such as user entity device 104, client device 106 and smart data hub 108 to obtain access to the trusted devices and their associated services available through network 112. As discussed above, phones, desktop personal computers (PCs), laptop PCs, and/or smart devices all can be used to profile and identify a legitimate user entity 102 (e.g., clients or employees) before granting access to network 112, computing systems, confidential financial information, secure facilities, restricted areas and the like. The system and method 100 of the following embodiments use the risk engine 110 to utilize a set of predictive analytics data that are derived from a plurality of different sources such as browser (105, 107) fingerprints, user entity device 104 fingerprints, and/or mobile inferred behavioral data. In at least one embodiment, three of these different sources will be used (i.e., multi-factor authentication). This enables login-signup or lifecycle management flows of target privileged accounts, websites and other identity access controlled platforms to measure risk and inject appropriate friction in the user entity access and use of the user entity device 104, client device 106 and/or network 112. Thus, allowing relying parties such as data or service providers to identify legitimate traffic and grant services while classifying suspicious visits and prevent threat actors.

The foregoing has outlined rather broadly features and technical advantages of examples in order that the detailed description that follows can be better understood. The foregoing embodiments are presently by way of example only; the scope of the present disclosure is to be limited only by the claims. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Each of the figures is provided for the purpose of illustration and description only and not as a definition of the limits of the claims. No language in the specification should be construed as indicating any non-claimed element as essential to the practice of the invention Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Specific details are given in the description to provide a thorough understanding of the embodiments. However, embodiments may be practiced without these specific details. For example, well-known processes, structures, and techniques have been shown without unnecessary detail in order to avoid obscuring the embodiments. This description provides example embodiments only, and is not intended to limit the scope, applicability, or configuration of the disclosure. Rather, the preceding description of the embodiments will provide those skilled in the art with an enabling description for implementing embodiments of the disclosure. Various changes may be made in the function and arrangement of elements without departing from the spirit and scope of the disclosure.

Although process (or method) steps may be described or claimed in a particular sequential order, such processes may be configured to work in different orders. In other words, any sequence or order of steps that may be explicitly described or claimed does not necessarily indicate a requirement that the steps be performed in that order unless specifically indicated. Moreover, the illustration of a process by its depiction in a drawing does not imply that the illustrated process is exclusive of other variations and modifications thereto, does not necessarily imply that the illustrated process or any of its steps are necessary to the embodiment(s), and does not imply that the illustrated process is preferred.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

The definitions of the words or elements of the claims shall include not only the combination of elements which are literally set forth, but all equivalent structure, material or acts for performing substantially the same function in substantially the same way to obtain substantially the same result.

Neither the Title (set forth at the beginning of the first page of the present application) nor the Abstract (set forth at the end of the present application) is to be taken as limiting in any way as the scope of the disclosed invention(s). The title of the present application and headings of sections provided in the present application are for convenience only, and are not to be taken as limiting the disclosure in any way.

Devices that are described as in "communication" with each other or "coupled" to each other need not be in continuous communication with each other or in direct physical contact, unless expressly specified otherwise. On the contrary, such devices need only transmit to each other as necessary or desirable, and may actually refrain from exchanging data most of the time. For example, a machine in communication with or coupled with another machine via the Internet may not transmit data to the other machine for long period of time (e.g. weeks at a time). In addition, devices that are in communication with or coupled with each other may communicate directly or indirectly through one or more intermediaries.

It should be noted that the recitation of ranges of values in this disclosure are merely intended to serve as a shorthand method of referring individually to each separate value falling within the range, unless otherwise indicated herein, and each separate value is incorporated into the specification as if it were individually recited herein. Therefore, any given numerical range shall include whole and fractions of numbers within the range. For example, the range "1 to 10" shall be interpreted to specifically include whole numbers between 1 and 10 (e.g., 1, 2, 3, . . . 9) and non-whole numbers (e.g., 1.1, 1.2, . . . 1.9).

The invention claimed is:

1. A method for secure authentication of a user entity identity comprising:
    a primary identity provider allows a user entity through a client device to enable a single sign on to a plurality of services;
    the primary identity provider collects the contextual and behavioral information of the user entity and the client device for access to at least one service of the plurality of services;
    the primary identity provider delegates login and authentication process including a risk based multi-factor authentication to a third party identity provider;
    the third party identity provider sends the contextual and behavioral information including at least one service identifier, a user identification, the client device, client device browser health, location, time, network, client device and client device browser fingerprint, and other attributes to a discrete risk engine of the third party identity provider; and
    conducts policy orchestration upon detection of anomaly of the at least one service and takes a predetermined action per policy and risk including terminating the specific service and session or step up authentication using a new discrete multi-factor authentication.

2. The method of claim 1, wherein the third party identity provider requests for step up or termination of more than a session of the at least one service associated with the user entity.

3. The method of claim 1, wherein the third party identity provider requests for step up or termination of more than the specific session of services associated with the user entity and terminates or steps up additional services such as another service.

4. The method of claim 1, wherein additional contextual data about a service provider state is streamed or batched via a smart data hub of the third party identity provider and make a primary identity provider aware of the context of the service provider by requesting step up authentication.

5. The method of claim 1 wherein smart multifactor authentication is provided via security assertion markup language version 2 (SAML 2.0) or open identification connection authentication (OIDC).

6. The method of claim 1, further comprising:
monitoring the client device by the risk engine during an active session to provide updates to the primary identity provider if an anomaly occurs during the active session.

7. The method of claim 1, wherein the risk engine is operated by artificial intelligence.

8. The method of claim 1, wherein the client device contextual factors and network contextual factors further include at least one of the group of egocentric or allocentric factors consisting of: mobile device model, mobile device hardware configuration, mobile device operating system, mobile device applications, mobile device web browser version, service set identifier (SSID) of the network WiFi, network information such as IP address, object classes transferred, screen size, font size, language, user entity habits including speed and style of user keyboard entry, mouse strokes, screen touch, adjacent companion mobile device in proximity, bio-behavioral data derived from the user entity such as walking gait, trusted locations of the user, haptic-tactic factors derived from hardware sensors embedded inside the device, various specialized sensor data captured by the hardware such as ambient noise, temperature, discrete movement and location of the mobile device, walking and exercise habits of owner, user entity location and user entity driving, transactions on mobile including services, applications used and their frequency and duration including calls, browsing, use of various applications, exercise routines, payments, user behavior analytics (UBA) services, identification authorization and proofing, secure data access, crowd control, safety, check-in and check-out services, short message service (SMS) concierge services, promotions, and location based service (LBS) functions.

* * * * *